United States Patent
Liu et al.

(10) Patent No.: US 11,740,893 B2
(45) Date of Patent: Aug. 29, 2023

(54) TREND MONITORING OF CODE REPOSITORIES AND RELATED INFORMATION

(71) Applicant: FUJITSU LIMITED, Kawasaki (JP)

(72) Inventors: Lei Liu, San Jose, CA (US); Wei-Peng Chen, Fremont, CA (US)

(73) Assignee: Fujitsu Limited, Kawasaki (JP)

( * ) Notice: Subject to any disclaimer, the term of this patent is extended or adjusted under 35 U.S.C. 154(b) by 23 days.

(21) Appl. No.: 17/302,400

(22) Filed: Apr. 30, 2021

(65) Prior Publication Data
US 2022/0350595 A1 Nov. 3, 2022

(51) Int. Cl.
*G06F 9/44* (2018.01)
*G06F 8/71* (2018.01)
(Continued)

(52) U.S. Cl.
CPC ............... *G06F 8/70* (2013.01); *G06F 9/451* (2018.02); *G06F 9/541* (2013.01); *G06F 16/2379* (2019.01); *G06F 40/40* (2020.01); *G06F 3/14* (2013.01); *G06F 8/36* (2013.01); *G06F 8/71* (2013.01); *G06F 8/75* (2013.01);
(Continued)

(58) Field of Classification Search
CPC ..... G06F 8/70; G06F 8/71; G06F 8/75; G06F 8/36; G06F 8/77; G06F 9/451; G06F 9/541; G06F 16/2379; G06F 16/54; G06F 16/5866; G06F 16/9535; G06F 16/245;
(Continued)

(56) References Cited

U.S. PATENT DOCUMENTS

2012/0240096 A1   9/2012  Sass
2014/0101633 A1*  4/2014  Fox ........................... G06F 8/71
                                                                717/101
(Continued)

OTHER PUBLICATIONS

Meital Ziberstein et al., Leveraging a Corpus of Natural Language Descriptions for Program Similarity, Nov. 2-4, 2016, [ Retrieved on Mar. 10, 2023], Retrieved from the internet: <URL: https://dl.acm.org/doi/pdf/10.1145/2986012.2986013> 15 Pages (197-211) (Year: 2016).*
(Continued)

*Primary Examiner* — Anibal Rivera
(74) *Attorney, Agent, or Firm* — Fujitsu Patent Center; Tiep Nguyen

(57) ABSTRACT

According to an aspect of an embodiment, operations for trend monitoring of code repositories and related information are provided. The operations include identifying a set of repositories from a collection of repositories hosted on one or more web-based repository hosting systems and collecting repository metadata for each repository. The operations further include generating a set of topic tags by using one or more natural language processing-based methods and collecting a set of statistics associated with each of the generated set of topic tags. The operations further include generating a set of presentation data based on one or more of the identified set of repositories, the collected repository metadata, the generated set of topic tags, and the collected set of statistics. The operations further include controlling a user device to display the generated set of presentation data onto an electronic User Interface of the user device.

19 Claims, 23 Drawing Sheets

(51) Int. Cl.

| | | |
|---|---|---|
| *G06F 16/25* | (2019.01) | |
| *G06F 8/36* | (2018.01) | |
| *G06F 40/174* | (2020.01) | |
| *G06F 40/205* | (2020.01) | |
| *G06F 8/70* | (2018.01) | |
| *G06F 9/54* | (2006.01) | |
| *G06F 16/23* | (2019.01) | |
| *G06F 40/40* | (2020.01) | |
| *G06F 9/451* | (2018.01) | |
| *G06F 3/14* | (2006.01) | |
| *G06F 16/435* | (2019.01) | |
| *G06F 8/77* | (2018.01) | |
| *G06F 16/245* | (2019.01) | |
| *G06F 8/75* | (2018.01) | |
| *G06F 16/58* | (2019.01) | |
| *G06F 16/9535* | (2019.01) | |
| *G06F 16/48* | (2019.01) | |
| *G06F 16/54* | (2019.01) | |
| *G06F 16/901* | (2019.01) | |

(52) U.S. Cl.
CPC .............. *G06F 8/77* (2013.01); *G06F 16/245* (2019.01); *G06F 16/435* (2019.01); *G06F 16/48* (2019.01); *G06F 16/54* (2019.01); *G06F 16/58* (2019.01); *G06F 16/5866* (2019.01); *G06F 16/9024* (2019.01); *G06F 16/9535* (2019.01)

(58) Field of Classification Search
CPC .... G06F 16/9024; G06F 16/435; G06F 16/48; G06F 16/58; G06F 40/40; G06F 3/14
See application file for complete search history.

(56) References Cited

U.S. PATENT DOCUMENTS

| | | | |
|---|---|---|---|
| 2014/0123178 A1* | 5/2014 | Burkitt | ............. H04N 21/41265 |
| | | | 725/34 |
| 2014/0289159 A1 | 9/2014 | Das | |
| 2015/0143328 A1 | 5/2015 | Cope | |
| 2021/0357209 A1* | 11/2021 | Ramachandra | ....... G06F 40/174 |

OTHER PUBLICATIONS

"Trending, See what the GitHub community is most excited about today"; author unknown, obtained from website, www.github.com/trending, on, Apr. 30, 2021; 4 pages.
"Explore . . . Here's what's popular on GitHub today . . . "; author unknown, obtained from, website www.github.com/explore, on, Apr. 30, 2021; 14 pages.
"GitLogs News—Discover the Top Trending Repos"; author unknown, obtained from website, www.gitlogs.com, on, Apr. 30, 2021; 14 pages.
"GitTrends:Monitoring Popular [LOGO] Projects"; Beta Version, author unknown, obtained from website www.gittrends.app/, on, Apr. 30, 2021, 1 page.
"Github Explore"; author unknown, obtained from website, www.gitmostwanted.com, on, Apr. 30, 2021, 1 page.
"Subscribe to Changelog Nightly"; author unknown, obtained from website, https://changelog.com/nightly, on, Apr. 30, 2021, 1 page.
"Octoverse"; author unknown, obtained from website, https://octoverse.github.com, on, Apr. 30, 2021, 1 page.
GitHut: A small place to discover languages in GitHub; author unknown, obtained from website, https://githut.info/, on, Apr. 30, 2021, 3 pages.

* cited by examiner

| Topic Tag | Logo | Short Description | Number of Repositories | Metadata |
|---|---|---|---|---|
| Ansible | | Ansible is a simple and powerful automation engine. | 2,355 | Meta-Data |
| Blockchain | | Blockchains are distributed ledgers that can record transactions between parties in a verifiable and permanent way. | 12,345 | Meta-Data |
| .... | | .... | | |

FIG. 8C

Electronic User Interface (UI) 800F — 816

File  Insert  View  Projects

Topic Tags of Daily popular repositories (new stars)

| Topic Tag | Logo | Short Description | Number of Repositories | Metadata |
|---|---|---|---|---|
| Arduino |  | Arduino is an open source hardware and software company and maker community. Arduino started in the early 2000s. Popular with electronic makers, Arduino offers a lot of flexibility through an open source system. | 19,289 | Meta-Data |
| Android | 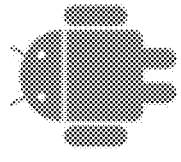 | Android was designed and built by Google in 2008. The operating system is written mainly in Java, with core components in C and C++. It is built on top of the Linux kernel, giving it incorporated security benefits. | 19,387 | Meta-Data |
| ..... | | ..... | ..... | ..... |

*FIG. 8F*

TREND MONITORING OF CODE REPOSITORIES AND RELATED INFORMATION

FIELD

The embodiments discussed in the present disclosure are related to trend monitoring of code repositories and related information.

BACKGROUND

Various organizations and individuals have, over several years, contributed towards creating a community of people who focus on supporting various open source initiatives. In Information Technology (IT), such initiatives have a purpose of improving public access to technology by creating an ecosystem that promotes free and open source software (OSS) projects. One of the reasons for creating such an ecosystem is that every person should be able to access resources required to implement and contribute towards the OSS projects, irrespective of whether the person is part of the IT industry or not. Over years, the community has grown bigger and has become more active. This has led to fast paced developments in various technologies related to IT. For many organizations in the IT industry, tracking such developments has become a business imperative or part of operational processes so as to keep up with the pace of developments in various technologies related to IT.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may include identifying a first set of repositories from a collection of repositories hosted on one or more web-based repository hosting systems. The identification may be based on popularity criteria and each repository in the collection of repositories includes a software code or a code snippet. The operations may further include collecting a repository metadata for each repository of the identified first set of repositories from one or more data sources. The one or more data sources may include the one or more web-based repository hosting systems. The operations may further include generating a first set of topic tags by using one or more natural language processing-based methods on the collected repository metadata and collecting first set of statistics associated with each of the generated first set of topic tags. The first set of statistics may be collected from the one or more data sources. The operations may further include generating a set of presentation data based on one or more of the identified first set of repositories, the collected repository metadata, the generated first set of topic tags, and the collected first set of statistics. Thereafter, the operations may further include controlling a user device to display the generated set of presentation data onto an electronic User Interface (UI) of the user device.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 8C is a diagram that illustrates an exemplary electronic user interface for displaying popular topic tags based on selection of a UI element;

FIG. 8F is a diagram that illustrates an exemplary electronic user interface for displaying topic tags of daily popular repositories;

Figure 1:
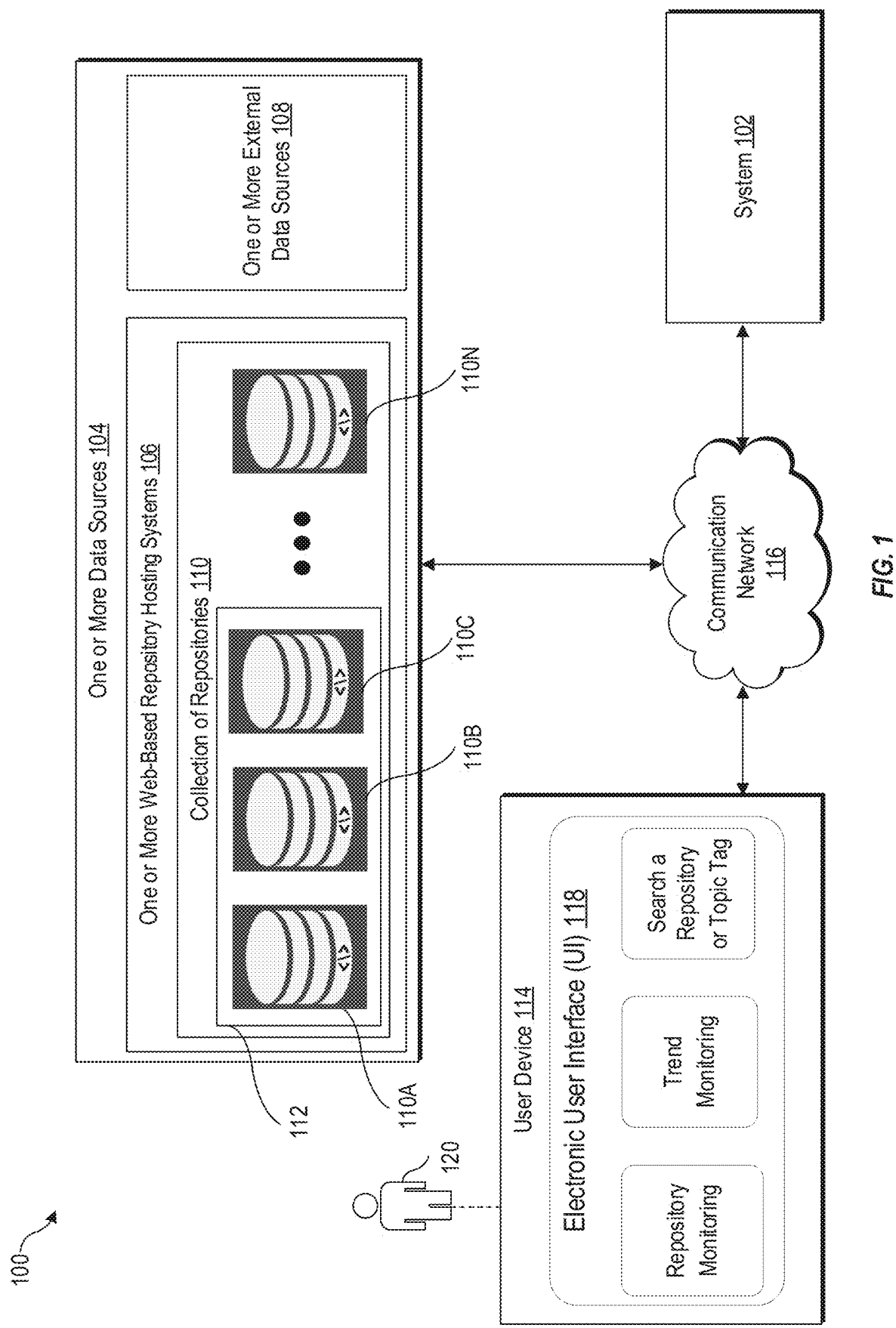
FIG. 1 is a diagram representing an exemplary environment related to trend monitoring of code repositories and related information.

all according to at least one embodiment described in the present disclosure.

DESCRIPTION OF EMBODIMENTS

Open Source Software (OSS) is becoming more important in the current industry. Web-based repository hosting systems, such as GitHub have a large community of developers and organizations for building and sharing open-source software. With increasing importance of OSS, it has become relevant to monitor various developments and trends in OSS. For many organizations in the IT industry, tracking such developments and trends has become a business imperative or part of operational processes so as to keep up with the pace of developments in various technologies related to IT.

In industry, there are many conventional solutions to monitor some trends related to OSS. Most of such solutions provide updates with a very coarse granularity (with focus on few domains). In some instances, trends may be available at a slower update rate (e.g., once a year). For example, a hype cycle for open-source software is published every year and the hype cycle provides insights about trending/popular open source software in the corresponding year. With increase in number of developments in OSS related projects, it has become an imperative to develop a system for trend monitoring of OSS projects/repositories at a granular level (in terms of frequency of updates/developments and depth of information related to individual OSS projects).

Some embodiments described in the present disclosure relate to a method and a non-transitory computer-readable medium for trend monitoring of code repositories and related information. From a collection of repositories, the system may identify a set of repositories based on popularity criteria. As part of an OSS project, each repository may include a software code or a code-snippet. During identification, both short-term popularity and long-term popularity of repositories may be considered. For instance, the system may identify daily popular repositories, weekly popular repositories, and monthly popular repositories. The system may also identify old repositories that may have gained popularity recently, new repositories that may be gaining popularity, most-liked repositories, most-used (or forked/downloaded) repositories, and most-active repositories, for example.

The system may extract human-labeled topic tags from publicly accessible pages dedicated to repositories. Also, the system may generate topic tags associated with the repositories, by using the natural language processing-based methods on metadata associated with the corresponding repository. The system may collect statistics related to the popular repositories and the topic tags.

The disclosed system may generate presentation data based on the collected information (such as popular repositories, topic tags, topic/repository metadata and statistics). Thereafter, the system may display the presentation data associated with popular repositories and/or popular topic tags onto a user interface of a user device. A user may be able to interact with the user interface to view various trends related to popular topic tags and popular repositories, read about individual repositories, and view statistics related to popularity of topic tags and repositories. Also, the user interface may include a search UI, which may enable the user to obtain specific trends or information on individual or a group of repositories/topic tags, using search strings (which may include keywords or filters). By using the user interface, users such as developers, project managers, analysts, or other stakeholders may be able to view various kinds of technology trends and developments in OSS. This may help them to stay up-to-date with technology and developments in OSS. It may even help them to re-align their products and services to cater to popular needs of the industry.

Conventional user interfaces for trend monitoring of OSS focus on users who require a high-level overview of various developments in OSS. For example, many conventional user interfaces focus on presenting a limited amount of information (which lacks details or granularity). In some instances, user interfaces focus on only few domains or topics, such as web development, machine learning, or big-data. In some other instances, user interfaces provide a very slow update (once in a month or year) on trends. These conventional user interfaces may lack in providing suitable information and suitable user-selectable options that could help users, such as developers, product managers, or other key stakeholders who may need granular updates on technology trends in OSS.

In contrast, the present disclosure provides an electronic user interface which provides suitable information and user-selectable options, which may improve the user's ability to explore and read about various trends and developments in OSS. It may also improve the user's ability in developing software applications, building strategies for products and services (catering to popular needs), and driving the focus of the organization in the direction in which the industry is heading. The electronic user interface may be an improved user interface which may delimit the type of information to be displayed and how the information is displayed. This may remove a need for hiring individual analysts, who may manually analyze various resources related to OSS to develop reports with specific trends/developments in OSS.

Embodiments of the present disclosure are explained with reference to the accompanying drawings.

FIG. 1 is a diagram representing an exemplary environment related to trend monitoring of code repositories and related information, arranged in accordance with at least one embodiment described in the present disclosure. With reference to FIG. 1, there is shown an example environment 100. In the example environment 100, there is shown a system 102 and one or more data sources 104 that may include one or more web-based repository hosting systems 106 and one or more external data sources 108. The one or more web-based repository hosting systems 106 may host a collection of repositories 110. The collection of repositories 110 may include, for example, a first repository 110A, a second repository 110B, a third repository 110C, and an Nth repository 110N. There is further shown a user device 114, a communication network 116, and an electronic user interface (UI) 118 rendered onto a display screen of the user device 114. The system 102, the one or more data sources 104, and the user device 114 may be communicatively coupled to each other, via the communication network 116.

There is further shown a user 120 who may be associated with the user device 114. Examples of the user device 114 may include, but are not limited to, a mobile device, a desktop computer, a laptop, a computer workstation, a server, such as a cloud server, or a group of servers. In one or more embodiments, the user device 114 may include a user-end terminal device and a server communicatively coupled to the user-end terminal device. Examples of the user-end terminal device may include, but are not limited to, a mobile device, a desktop computer, a laptop, or a computer workstation.

The one or more data sources 104 may include suitable logic, circuitry, and interfaces that may be configured to store information associated with the collection of repositories 110. Each repository may include a code snippet, or a software code associated with an open-source software (OSS) project. By way of example, and not limitation, Examples of the one or more data sources 104 may include, but are not limited to, a web-based code hosting server, a database server, a file server, a web server, a Really Simple Syndication (RSS) feed, servers that host website(s) and web application(s) related to repositories (which store software code or snippet code).

In an embodiment, the one or more data sources 104 may be implemented as servers, which may include storage distributed across one or more availability zones (e.g., datacenters). In an embodiment, each data source may include a front-end system and a back-end system. The front-end system may be configured to provide an interface (such as webpages or a client-side interface of a web-application) to view information associated with various repositories. The back-end system may store databases, logic, and instructions to display content on the interface provided by the front-end system.

In an embodiment, the one or more data sources 104 may include the one or more web-based repository hosting systems 106 and the one or more external data sources 108. The one or more web-based repository hosting systems 106 may host repositories (such as the collection of repositories 110) and may allow individuals and/or organizations to manage such repositories through a web-based interface. In some instances, a repository hosting system may also include webpages which include various listings of repositories or topic tags related to such repositories. Each repository may include a software code or a code snippet (as part of an OSS project) and project-related files, such as a documentation, a change log, a readme file with a description of repository, test results, and one or more links or references. Users (including the user 120) may be able to access the collection of repositories 110 through a web-client (for example, a web browser), a command-line interface, or an application programming interface (API) call.

For each repository, the one or more web-based repository hosting systems 106 may collect and publish information, such as, but not limited to, a repository name, a repository location (e.g., a Uniform Resource Locator (URL)), a repository author name, a number of times the repository is shared, viewed, downloaded, or liked, a list of contributors to the repository, a rank, a list of edits or updates to the repository within a period, a date/time at which the repository was created, a list of topic tags (human-labeled) for the repository, and a programming language used for writing the software code included in the repository. In some instances, the one or more web-based repository hosting systems 106 may implement a version-control systems (VCS) that may allow individual developers or organizations to keep track of versions of the software code or the code snippet in a repository.

The one or more external data sources 108 may include suitable logic, circuitry, and interfaces that may be configured to store information related to repositories hosted on the one or more web-based repository hosting systems 106. By way of example, and not limitation, the one or more external data sources 108 may include one or more of repository ranking data (e.g., popular repositories), repository-related statistics, a listing of repositories, repository descriptions, tutorials on use of software code in repositories, repository or code-related discussions, and other information (such as articles, news, or external documentations).

In operation, the system 102 may be configured to identify a first set of repositories 112 from the collection of repositories 110 that may be hosted on the one or more web-based repository hosting systems 106. The identification may be based on popularity criteria. By way of example, and not limitation, the popularity criteria may specify popularity tags (such as trending, popular, most downloaded, most shared, most watched, most contributed, and most active) and selection rules (such as data/time-based rules). Within the collection of repositories 110, repositories which satisfy at least one of the popularity tags and/or the selection rules may be identified the first set of repositories 112. Details about the identification of the first set of repositories 112 are provided, for example, in FIG. 4.

Based on the identification of the first set of repositories 112, the system 102 may be configured to collect repository metadata for each repository of the identified first set of repositories 112. The system 102 may collect the repository metadata from the one or more data sources 104 (which includes the one or more web-based repository hosting systems 106). The repository metadata may include, for example, a number of likes associated with the corresponding repository, a number of contributions made by one or more developers associated with the corresponding repository, a first type of repository description (such as a brief description about the corresponding repository), a second type of repository description (such as detailed description about the corresponding repository), and the like. In an embodiment, the repository metadata may be collected periodically at each interval in a schedule using a set of API calls to the one or more data sources 104. The details about the repository metadata are provided, for example, in FIG. 4.

The system 102 may be further configured to generate a first set of topic tags by using one or more natural language processing-based methods on the collected repository metadata. In an embodiment, for each repository in the identified first set of repositories 112, the collected repository metadata may include a first type of description (e.g., a short description) and a second type of description (e.g., a long description). By using one or more natural language processing-based methods on both the first type of description and the second type of description, the first set of topic tags may be generated. Each topic tag of the first set of topic tags may act as a descriptor or a label to identify concept(s), a technology, a category, an intended purpose or application, a subject area, or other information on repositories associated with the topic tag. For example, topic tags for a repository which includes a software code for object detection may include a first topic tag as image processing, a second topic tag as classification, a third topic tag as object detection, and a fourth topic tag as name of a neural network framework. Details on the generation of the first set of topic tags are provided, for example, in FIG. 5A, and FIG. 5B.

Based on the generation of the first set of topic tags, the system 102 may be configured to collect a first set of statistics associated with each of the generated first set of topic tags. The first set of statistics may be collected from one or more data sources 104 and may include, for example, a count of repositories associated the corresponding topic tag, a set of popular authors associated with the corresponding topic tag, a set of popular/active contributors associated with the corresponding topic tag, and the like.

The system 102 may be further configured to generate a set of presentation data based on one or more of the identified first set of repositories, the collected repository metadata, the generated first set of topic tags, and the collected first set of statistics. By way of example, and not limitation, the set of presentation data may include a list of popular repositories, pages which description and statistics related to each repository in the list, a list of popular topic tags, and pages which provide statistics related to such topic tags. The system 102 may be configured to control the user device 114 to display the generated set of presentation data onto the electronic UI 118 of the user device 114. Details about the generation of the set of presentation data and control of the user device 114 are provided, for example, in FIG. 7A, FIG. 7B, FIG. 7C, FIG. 7D, FIG. 7E, FIG. 7F, FIG. 7G, FIG. 8A, FIG. 8B, FIG. 8C, FIG. 8D, FIG. 8E, FIG. 8F, FIG. 9A, and FIG. 9B.

It should be noted that the communication between the system 102, the one or more data sources 104, and the user device 114 may be performed via the communication network 116. The communication network 116 may include a communication medium through which the system 102 may communicate with the one or more data sources 104, the user device 114, and/or different devices (not shown). Examples of the communication network 116 may include, but are not limited to, the Internet, a cloud network, a cellular network (such as a $4^{th}$ Generation Long-Term Evolution (LTE) or $5^{th}$ generation New Radio (NR)), a Wireless Fidelity (Wi-Fi) network, a Personal Area Network (PAN), a Local Area Network (LAN), and/or a Metropolitan Area Network (MAN). Various devices in the example environment 100 may be configured to connect to the communication network 116, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

Modifications, additions, or omissions may be made to the system 102 without departing from the scope of the present disclosure. For example, in some embodiments, the system 102 may include any number of other components that may not be explicitly illustrated or described.

Figure 2:
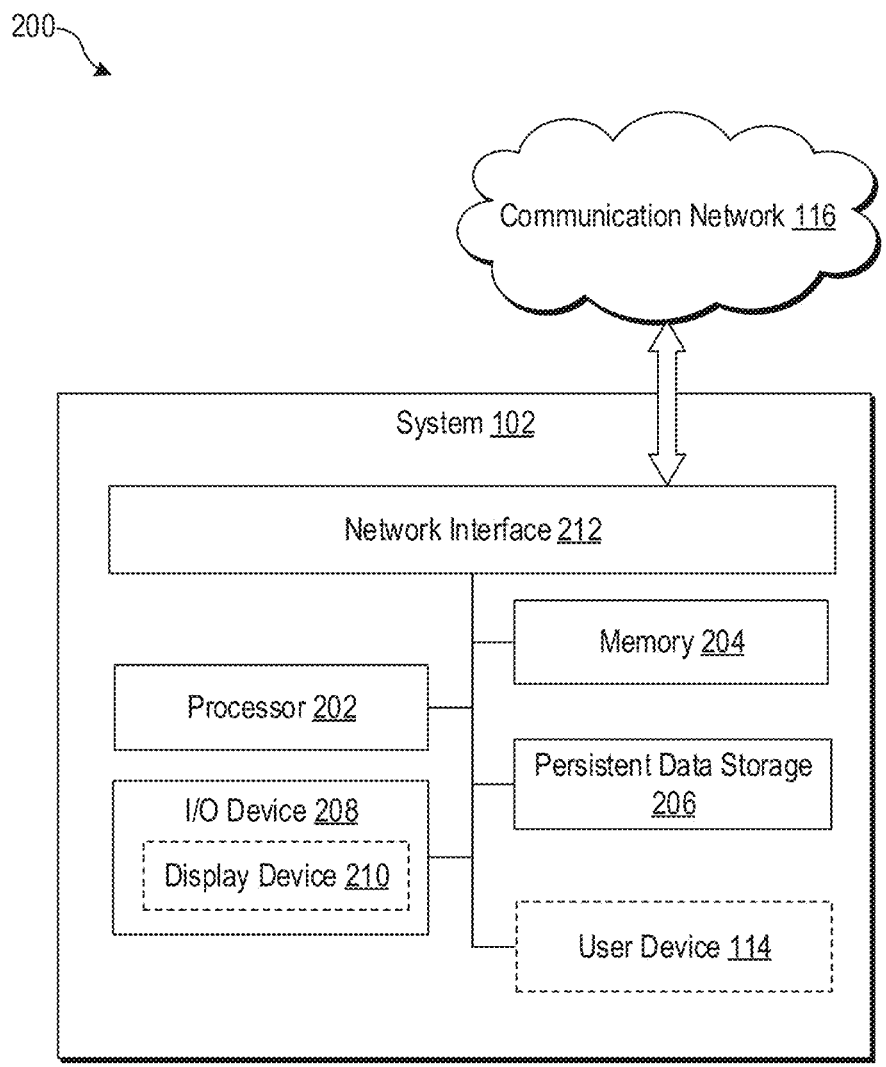
FIG. 2 is a block diagram of a system for trend monitoring of code repositories and related information.

FIG. 2 is a block diagram of a system for trend monitoring of code repositories and related information, arranged in accordance with at least one embodiment described in the present disclosure. FIG. 2 is explained in conjunction with elements from FIG. 1. With reference to FIG. 2, there is shown a block diagram 200 of the system 102 of FIG. 1.

The processor 202 may include suitable logic, circuitry, and/or interfaces that may be configured to execute program instructions associated with different operations to be executed by the system 102. The processor 202 may include any suitable special-purpose or general-purpose computer, computing entity, or processing device, including various computer hardware or software modules, and may be configured to execute instructions stored on any applicable computer-readable storage media. For example, the processor 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 202 may include any number of processors configured to, individually or collectively, perform or direct performance of any number of operations of the system 102, as described in the present disclosure.

In some embodiments, the processor 202 may be configured to interpret and/or execute program instructions and/or process data stored in the memory 204 and/or the persistent data storage 206. In some embodiments, the processor 202 may fetch program instructions from the persistent data storage 206 and load the program instructions in the memory 204. After the program instructions are loaded into memory 204, the processor 202 may execute the program instructions. Some of the examples of the processor 202 may be a Central Processing Unit (CPU), a Reduced Instruction Set Computer (RISC) processor, an ASIC processor, a Complex Instruction Set Computer (CISC) processor, a Graphical Processing Unit (GPU), a co-processor, and/or a combination thereof.

The memory 204 may include suitable logic, circuitry, and/or interfaces that may be configured to store program instructions executable by the processor 202. In certain embodiments, the memory 204 may be configured to store information associated with the collection of repositories 110, and/or the first set of repositories 112. In certain embodiments, the memory 204 may be configured to store the first set of topic tags and/or a second set of human-labeled topic tags. The memory 204 may include computer-readable storage media for carrying or having computer-executable instructions or data structures stored thereon. Such computer-readable storage media may include any available media that may be accessed by a general-purpose or special-purpose computer, such as the processor 202.

By way of example, and not limitation, such computer-readable storage media may include tangible or non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations associated with the system 102.

The persistent data storage 206 may include suitable logic, circuitry, and/or interfaces that may be configured to store program instructions executable by the processor 202. The persistent data storage 206 may include computer-readable storage media for carrying or having computer-executable instructions or data structures stored thereon. Such computer-readable storage media may include any available media that may be accessed by a general-purpose or special-purpose computer, such as the processor 202.

By way of example, and not limitation, such computer-readable storage media may include tangible or non-transitory computer-readable storage media including optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations associated with the system 102.

The I/O device 208 may include suitable logic, circuitry, interfaces, and/or code that may be configured to receive one or more user inputs. The I/O device 208 may be further configured to provide an output in response to the one or more user inputs. The I/O device 208 may include various input and output devices, which may be configured to communicate with the processor 202 and other components, such as the network interface 212. Examples of the input devices may include, but are not limited to, a touch screen, a keyboard, a mouse, a joystick, and/or a microphone. Examples of the output devices may include, but are not limited to, a display device 210 and a speaker.

The display device 210 may include suitable logic, circuitry, interfaces, and/or code that may be configured to render the electronic UI 118 on to a display screen of the display device 210. In one or more embodiments, the one or more user inputs from a user (such as the user 120) may be received directly, via the display device 210. In such cases, the display screen of the display device 210 may be a touch screen to receive the one or more user inputs. The display device 210 may be realized through several known technologies such as, but not limited to, a Liquid Crystal Display (LCD) display, a Light Emitting Diode (LED) display, a plasma display, and/or an Organic LED (OLED) display technology, and/or other display technologies. Additionally, in some embodiments, the display device 210 may refer to a display screen of smart-glass device, a 3D display, a see-through display, a projection-based display, an electrochromic display, and/or a transparent display.

The network interface 212 may include suitable logic, circuitry, interfaces, and/or code that may be configured to establish a communication among the system 102, the one or more data sources 104, and the user device 114 via the communication network 116. The network interface 212 may be implemented by use of various known technologies to support wired or wireless communication of the system 102, via the communication network 116. The network interface 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 212 may communicate via wireless communication with networks, such as the Internet, an Intranet, and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), or Wi-MAX.

The functions or operations executed by the system 102, as described in FIG. 1, may be performed by the processor 202. Operations executed by the processor 202 are described in detail, for example, in FIG. 3, FIG. 4, FIG. 5A, FIG. 5B, FIG. 6, FIG. 7A, FIG. 7B, FIG. 7C, FIG. 7D, FIG. 7E, FIG. 7F, FIG. 7G, FIG. 8A, FIG. 8B, FIG. 8C, FIG. 8D, FIG. 8E, FIG. 8F, FIG. 9A, FIG. 9B, and FIG. 10.

Figure 3:
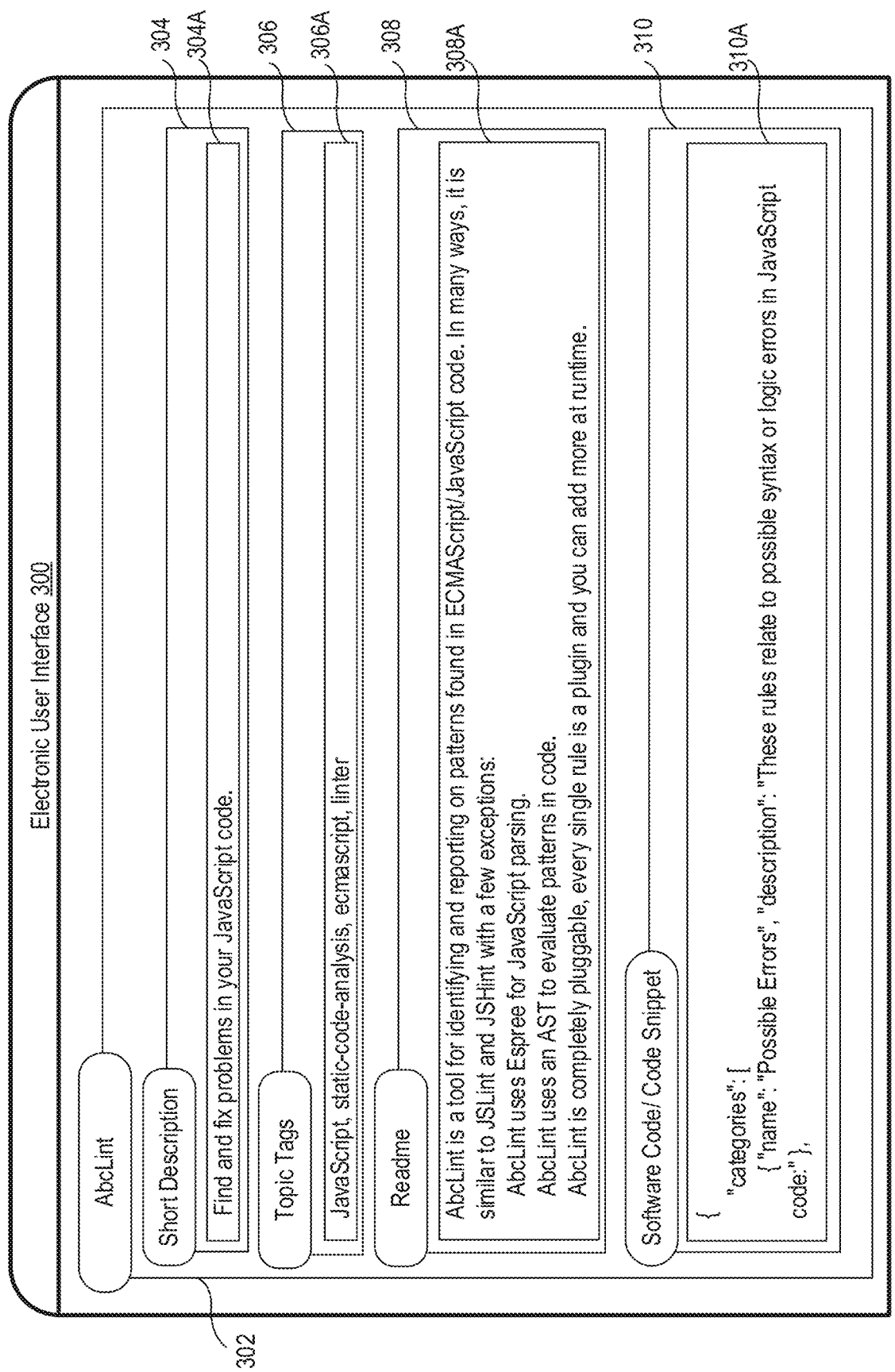
FIG. 3 is a diagram that depicts an example webpage of an exemplary repository hosted on an exemplary web-based repository hosting system.

FIG. 3 is a diagram that depicts an example webpage of an exemplary repository hosted on an exemplary web-based repository hosting system, according to at least one embodiment described in the present disclosure. FIG. 3 is explained in conjunction with elements from FIG. 1 and FIG. 2. With reference to FIG. 3, there is shown an electronic UI 300.

On the example electronic UI 300, there is shown a set of UI elements, such as a first UI element 302, a second UI element 304, a third UI element 306, a fourth UI element 308, and a fifth UI element 310. In FIG. 3, the first UI element 302 may include a name of the repository. As shown, for example, the name of the repository is "AbcLint".

The second UI element 304 may be labeled as, for example, "Short Description" and may include a short description textbox 304A. The short description textbox 304A may be a textbox in which the user 120 (who may be the author of the repository) may enter a short description or a brief summary about the repository. In an embodiment, content of the short description textbox 304A may be referred to as a first type of repository description.

The third UI element 306 may be labeled as, for example, "Topic Tags" and may include a topic tags textbox 306A. The topic tags textbox 306A may be a textbox in which the user 120 may enter a set of tags associated with the exemplary repository. In an embodiment, content of the topic tags textbox 306A may be referred to as a second set of human-labeled topic tags (which may be different from the first set of topic tags (generated in FIG. 1, for example).

The fourth UI element 308 may be labeled as, for example, "Readme" and may include a readme textbox 308A. The readme textbox 308A may be a textbox in which the user 120 may enter a detailed description about the repository. By way of example, and not limitation, content in the readme textbox 308A may include answers to following questions—
  1. What is the repository used for?
  2. Why is the repository useful?
  3. How to get started with using software code in the repository?
  4. What are some links or resources to help users with implementing the software code in the repository?
  5. Who maintains and contributes to the repository?
The content of the readme textbox 308A may be referred to as the second type of repository description.

The fifth UI element 310 may be labeled as, for example, "Software code or code snippet" and may include a code textbox 310A. The code textbox 310A may be a textbox, using which the user 120 may include the software code or a snippet of the code for an OSS project in the repository. Each repository of the collection of repositories 110 may have a name and may store the first type of repository description, the second type of repository description, the second set of human-labeled topic tags, and the software code (or the code snippet) in one or more files.

Figure 4:
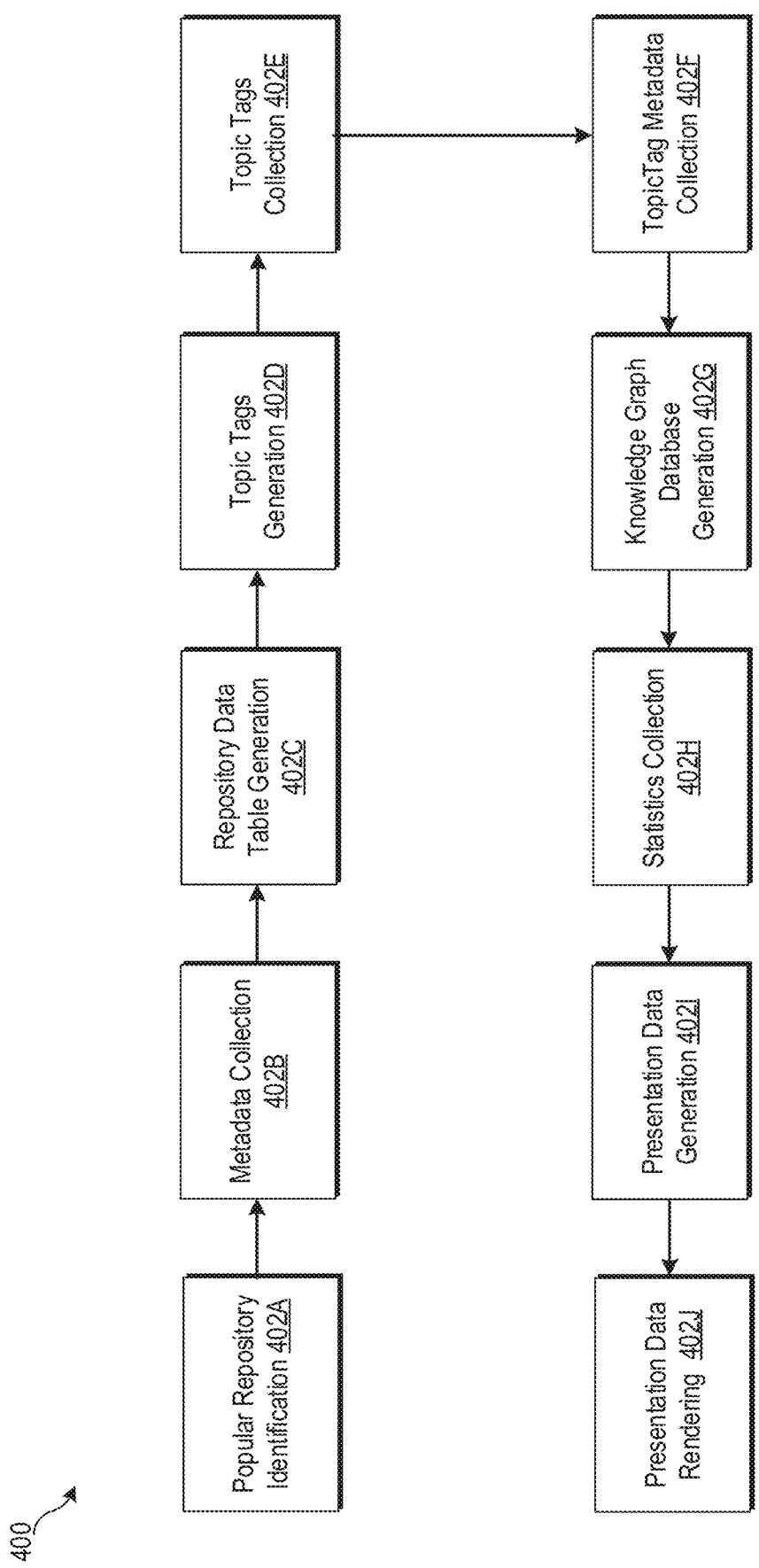
FIG. 4 depicts a block diagram that illustrates a set of operations for trend monitoring of code repositories and related information.

FIG. 4 depicts a block diagram that illustrates a set of operations for trend monitoring of code repositories and related information, in accordance with example embodiments. FIG. 4 is explained in conjunction with elements from FIG. 1, FIG. 2, and FIG. 3. With reference to FIG. 4, there is shown a set of exemplary operations 400. The exemplary operations illustrated in the block diagram may be performed by any computing system or device, such as by the system 102 of FIG. 1 or by the processor 202 of FIG. 2.

At 402A, a popular repository identification operation may be performed. In such an operation, the processor 202 may be configured to identify the first set of repositories 112 from the collection of repositories 110 hosted on the one or more web-based repository hosting systems 106. The first set of repositories may be identified based on popularity criteria. In an embodiment, from the collection of repositories 110, repositories categorized as trending or popular within a period may be identified as the first set of repositories 110. In another embodiment, the first set of repositories may be repositories associated with one or more popularity tags (such as 'most used' repositories, 'most starred' repositories, 'most active' repositories etc).

To identify the first set of repositories 112, the processor 202 may be configured to generate a plurality of query strings based on one or more search parameters. The one or more search parameters may include at least one of a period filter, an interval filter, or one or more popularity tags specified in the popularity criteria. The period filter may be used to identify popular repositories in a period (such as since last month, since last week, or since last date). The interval filter may be used to identify popular repositories within an interval (such as two dates or two timestamps). The one or more popularity tags may be used to identify popular repositories such as top 'N' most used repositories, top 'N' most starred repositories, top 'N' most shared repositories, top 'N' most contributed repositories. Here, 'N' may be any non-zero whole number.

After the generation of the plurality of query strings, each query string of the generated plurality of query strings may be appended to a corresponding uniform resource locator (URL) of a webpage hosted on the one or more data sources 104. In some embodiments, one or more query strings may be appended to a corresponding uniform resource locator (URL) of a webpage hosted on the one or more external data sources 108.

The processor 202 may be configured to query the one or more data sources 104 using the generated plurality of query strings (appended to URLs) to generate a first plurality of tables. Each of the generated first plurality of tables may list repositories associated with one or more popularity tags. The repositories listed in each of the generated first plurality of tables may be included in the identified first set of repositories.

By way of example, and not limitation, to identify the top trending repositories using URL of a first data source, the plurality of query strings may include "/trending?since=daily", "/trending?since=weekly", and "/trending?since=monthly". To identify the trending repositories using URL of a second data source, the plurality of query strings may include "/search?from=last-week&topic=stars %3A %3E0" and "/search?from=last-week&topic=stars %3A %3E0". To identify the trending repositories using URL of a third data source, the plurality of query strings may include "/top/wanted/solid/1", "/top/stars/solid/1", "/top/stars/rising/1", and "top/wanted/rising/1". To identify the trending repositories a website hosting a changelog of repositories, a query string may include date in "/YYYY/MM/DD" format as a search parameter.

In an embodiment, after querying the one or more data sources 104, the system 102 may execute a web-crawling or a web-scraping method to extract data from webpages, which may be received in response to the query. The first plurality of tables may be generated based on the extracted data. Each table of the generated first plurality of tables may include a timestamp and a list of repositories. By way of example, and not limitation, the first plurality of tables may include a daily trending table and a monthly trending table. An example of the daily trending table is presented in Table 1, as follows:

TABLE 1

| Daily Trending Table | | |
|---|---|---|
| 15/03/2021 | 16/03/2021 | 17/03/2021 |
| Aaa/Bbb | Ccc/Ddd | Ccc/Ddd |
| Ccc/Ddd | Eee/Fff | Eee/Fff |
| Eee/Fff | Xxx/Yyy | Aaa/Bbb |
| ... | ... | ... |

An example of the monthly trending table is presented in Table 2, as follows:

TABLE 2

| Monthly Trending Table | | |
|---|---|---|
| 15/01/2021 | 15/02/2021 | 15/03/2021 |
| Xyz/Xyzz | Mmm/Nnn | Aaa/Bbb |
| Aaa/Abcc | Rrr/Sss | Ccc/Ddd |
| Eee/Fff | Ppp/Qqq | Eee/Fff |
| ... | ... | ... |

Each of the generated first plurality of tables may be updated periodically based on one or more update rules. For example, an update rule for the daily trading table may require the daily trading table to be updated on daily basis by querying the one or more data sources 104 using the query strings (with date or period-specific search parameters). Similarly, an update rule for the monthly trending table may require the monthly trending table to be updated at a specific date-time of each month (for instance, $1^{st}$ of each month at 10:00 AM) by querying the one or more data sources using the query strings (date-time specific search parameters). In an embodiment, the update rule(s) may be different for each of the generated first plurality of tables. In another embodiment, the update rule(s) may be same for each of the generated first plurality of tables.

In an embodiment, the generated first plurality of tables may include a table for daily popular repositories with most new stars or likes, a table for daily popular repositories with most forks or downloads, a table for daily popular repositories with new activities, a table for weekly popular repositories with most new stars or likes, a table for weekly popular repositories with most new forks or downloads, a table for weekly popular repositories with most new activities, a table for monthly popular repositories with most new stars or likes, a table for monthly popular repositories with most new forks or downloads, a table for monthly popular repositories with most new activities, a table for new repositories which have recently gained popularity (update daily), a table for old repositories which have only gained popularity recently (updated daily), a table for most starred repositories, a table for most forked repositories, and a table for most active repositories.

After the generation of the first plurality of tables, the processor 202 may be configured to merge the generated first plurality of tables into a watchlist table. Each record of the watchlist table may include a repository name or identifier (such as a repository URL) and names of one or more tables in which the repository name or identifier occurs. Repositories listed in the watchlist table may be referred to as the identified first of repositories 112. Example of the watchlist table is presented in Table 3, as follows:

TABLE 3

| Watchlist Table | |
|---|---|
| Repository Name | Source Tables |
| Aaa/Bbb | Daily Trending Tables, Monthly Trending Table |
| Ccc/Ddd | Daily Trending Tables, Monthly Trending Table, Weekly Trending Table |
| Eee/Fff | Most Starred Repository Table, Most Active Repository Table, Daily Trending Table, Monthly Trending Table |
| . . . | . . . |
| Rrr/Sss | Monthly Trending Table |

In another embodiment, the processor 202 may be configured to extract a list of repositories using a first set of application programming interface (API) calls to the one or more data sources 104. Each API call of the first set of API calls may include one or more search parameters. The one or more search parameters may include at least one of the period filter, the interval filter, or the one or more popularity tags specified in the popularity criteria.

The processor 202 may be configured to filter the extracted list of repositories based on first criteria. The first criteria may correspond to a first rule for extracting the list of repositories associated with a count of the popularity tags (such as most used (or forked) repositories in last 1 week or most starred repositories in last 1 month). The processor 202 may be configured to populate a second plurality of tables using the filtered list of repositories. The second plurality of tables may be populated according to the one or more popularity tags. By way of example, and not limitation, the second plurality of tables may include a most-used (or forked) repositories table. An example table of the most used (or forked) repositories is presented in Table 4, as follows:

TABLE 4

| Table of most-used (or Forked) repositories | | |
|---|---|---|
| Repository Name | Lower Threshold | Higher Threshold |
| Aaa/Bbb, Mmm/Nnn | 3000 | — |
| Ccc/Ddd | 2000 | 2999 |
| . . . | . . . | . . . |
| Rrr/Sss | 100 | 500 |

The second plurality of tables may also include a table of most starred repositories.

An example table of most starred repositories is presented in Table 5, as follows:

TABLE 5

| Table of most starred repositories | | |
|---|---|---|
| Repository Name | Lower Threshold | Higher Threshold |
| Aaa/Bbb, Eee/Fff | 15000 | — |
| Ccc/Ddd | 10000 | 14999 |
| . . . | . . . | . . . |
| Ppp/Qqq | 100 | 500 |

Each of the generated second plurality of tables may be updated periodically based on one or more update rules. For example, an update rule may require updating each of the generated second plurality of tables periodically every day, every week, or any specific period. In an embodiment, the update rule(s) may be same for each of the generated second plurality of tables. In another embodiment, the update rule(s) may be different for each of the generated second plurality of tables.

The processor 202 may be configured to merge the generated second plurality of tables into the watchlist table. Each record of the watchlist table may include a repository name or identifier and names of one or more of the generated first plurality of tables and the generated second plurality of tables, in which the repository name or identifier occurs. Repositories listed in the watchlist table may be referred to as the identified first of repositories 112. Example of the watchlist table is presented in Table 6, as follows:

TABLE 6

| Watchlist Table | |
|---|---|
| Repository Table | Source Tables |
| Aaa/Bbb | Daily Trending Tables, Monthly Trending Table, Most Used Repositories Table, Most Starred Repositories Table |
| Ccc/Ddd | Daily Trending Tables, Monthly Trending Table, Weekly Trending Table, Most Used Repositories Table, Most Starred Repositories Table |
| Eee/Fff | Most Starred Repository Table, Most Active Repository Table, Daily Trending Table, Monthly Trending Table, Most Starred Repositories Table |
| . . . | . . . |
| Rrr/Sss | Monthly Trending Table, Most Used Repositories Table |

In an embodiment, the watchlist table may be updated periodically based on pre-set update instructions. For example, the watchlist table may be updated every day at a particular time (e.g., 11:00 PM). In another embodiment, the watchlist table may be updated whenever at least one of the generated first plurality of tables or the generated second plurality of tables is updated.

At 402B, a metadata collection operation may be performed. In the metadata collection operation, the processor 202 may be configured to collect repository metadata for each repository of the identified first set of repositories 112 (listed in the watchlist table). The repository metadata may be collected from the one or more data sources 104. In an embodiment, the repository metadata may be collected from the one or more web-based repository hosting systems 106. In another embodiment, the repository metadata may be collected from the one or more external data sources 108 (which may be different from the one or more web-based repository hosting systems 106).

In an embodiment, the repository metadata for each repository of the identified first set of repositories may be collected by using a second set of API calls to the one or more data sources 104. For each repository, the collected repository metadata may include, for example, a name of repository, URL of an homepage for the corresponding repository (hosted on a first web-based repository hosting system), a programming language in which the software code or the code snippet (included in the corresponding repository) is written, license information associated with the corresponding repository, a branch count associated with the corresponding repository, a commit count associated with the corresponding repository, a contributors count associated with the corresponding repository, a package count associated with the corresponding repository, a fork count associated with the corresponding repository, issues associated with the corresponding repository, a milestone count associated with the corresponding repository, a number of pull requests associated with the corresponding repository, a release count associated with the corresponding repository, a star count associated with the corresponding repository, a watchers count associated with the corresponding repository, a creation timestamp associated with the corresponding repository, a last updated timestamp associated with the corresponding repository, a second set of human-labeled topic tags associated with the corresponding repository, the first type of repository description (short description), the second type of repository description (long description), and the like. The repository metadata may be collected periodically at each interval in a schedule. For example, the repository metadata may be updated every day or at other periods (for example, weekly, fortnightly, monthly, and the like).

At 402C, a repository data table generation operation may be performed. The processor 202 may be configured to generate a plurality of repository data tables. Each of the plurality of repository data tables may be generated based on the collected repository metadata for a corresponding repository of the identified first set of repositories 112. After generating, a repository data table may exist for each repository of the identified first set of repositories 112 (i.e. each repository in the watchlist table). Each repository data table may include the collected repository metadata of the associated repository according to a particular schema. An example repository data table for a first repository is presented in Table 7, as follows:

set of repositories 112. Each topic tag may indicate, for example, a technology, a particular concept or theme, an intended purpose, a programming language, a named-entity, or a subject/research area. In an embodiment, the first set of topic tags may be generated by using one or more natural language processing-based methods on the collected repository metadata. Specifically, for each repository, the first type of repository description and the second type of repository description (from the repository data table (generated at 402C)) may be used to generate the first set of topic tags.

While the first type of repository description may include a brief summary about the repository, the second type of repository description may include a detailed description (e.g., several paragraphs) about the repository. For example, the first type of repository description may introduce the repository and its functions in few sentences. Whereas, the second type of repository description may be a readme file that may include details, such as particular use-cases for the software code in the repository, usefulness of repository, ways to implement or to get started with the software code in the repository, links or resources which may help with issues faced during implementation of the software code, and information on contributors and author(s) of the repository. Further details about the generation of the first set of topic tags from the first type of repository description and the second type of repository description are provided, for example, in FIGS. 5A and 5B.

At 402E, a topic tags collection operation may be performed. The processor 202 may be configured to collect a second set of human-labeled topic tags associated with the collection of repositories 110. For each repository, human-labeled topic tags may be added by the author of the corresponding repository using, for example, the topic tags textbox 306A. The second set of human-labeled topic tags may be collected from the collected repository metadata (as described in 402B and 402C) associated with the corresponding repository. In an embodiment, the second set of human-labeled topic tags may be collected based on using a third set of API calls to the one or more data sources 104 or using web-scraping methods on webpages hosted on the one or more data sources 104.

At 402F, a topic tag metadata collection operation may be performed. The processor 202 may be configured to collect topic tag metadata (or topic metadata) associated with each of the generated first set of topic tags and the collected second set of human-labeled topic tags. In an embodiment,

TABLE 7

| Example repository data table | | | |
| --- | --- | --- | --- |
| Timestamp | Feb. 3, 2021 | Feb. 10, 2021 | Feb. 17, 2021 |
| Repository URL | abc.com/aaa/bbb | abc.com/aaa/bbb | . . . |
| Number of Used by | 21 | 26 | . . . |
| Stars | 155 | 200 | . . . |
| Watches | 25 | 45 | . . . |
| First Type of Description | This Repository is for . . . | This Repository is for . . . | . . . |
| Second Type of Description | Bbb is a tool for identification of . . . | Bbb is a tool for identification of . . . | . . . |
| Human-labeled topic tags | Code-analysis, de-bugging, Java, . . . | Code-analysis, de-bugging, Java, . . . | . . . |
| . . . | . . . | . . . | . . . |
| . . . | . . . | . . . | . . . |

At 402D, topic tags generation operation may be performed. The processor 202 may be configured to generate a first set of topic tags for each repository of the identified first the topic tag metadata may be collected from the one or more data sources 104 by using a fourth set of API calls to the one or more data sources 104 or by using web scraping methods on webpages hosted on the one or more data sources 104. The collected topic tag metadata may include, for example, a name associated with a corresponding topic tag, a topic URL associated with the corresponding topic tag, a logo associated with the corresponding topic tag, one or more related topic tag names associated with the corresponding topic tag, a release date associated with the corresponding topic tag, a short description associated with the corresponding topic tag, and the like.

In an embodiment, the processor 202 may be configured to generate a plurality of topic tag data tables based on the collected topic metadata. Specifically, the processor 202 may be configured to generate a topic data table for each topic tag in the generated first set of topic tags and the collected second set of human-labeled topic tags. Each topic tag data table may include the collected topic metadata for the associated topic tag. By way of example, and not limitation, a first topic tag data table of the generated plurality of topic tag data tables for a first topic tag is presented in Table 8, as follows:

TABLE 8

First topic tag data table

| Timestamp | 02/03/2021 | 02/10/2021 | 02/17/2021 |
|---|---|---|---|
| Topic Name | Blockchain | Blockchain | ... |
| Release Date | 2008 | 2008 | ... |
| Topic URL | abc.com/blockchain | abc.com/blockchain | ... |
| Related Topic Tag Names | bitcoin, Crypto-currency, . . . | bitcoin, Crypto-currency, . . . | ... |
| Short Description | A blockchain is a digitized, decentralized ledger of transactions . . . | A blockchain is a digitized, decentralized ledger of transactions . . . | ... |
| Number of Repositories | 12,120 | 12,345 | ... |
| ... | ... | ... | ... |
| ... | ... | ... | ... |

At 402G, a knowledge graph database generation operation may be performed. The processor 202 may be configured to generate a knowledge graph database based on the collected topic metadata, the generated set of topic tags, and the collected second set of human-labeled topic tags. The knowledge graph database may represent a collection of interlinked entities that may represent, for example, objects, events, techniques, technologies, concepts, and the like. The knowledge graph database may put the collected topic metadata, the generated set of topic tags, and the collected second set of human-labeled topic tags in context via linking and semantic metadata. Also, the knowledge graph database may provide a framework for data integration, unification, analytics, keyword-based search, and data sharing. An example of the knowledge graph database is provided, for example, in FIG. 6.

At 402H, a statistics collection operation may be performed. The processor 202 may be configured to collect a first set of statistics associated with each of the generated first set of topic tags and a second set of statistics associated with each topic tag in the second set of human-labeled topic tags. The first set of statistics and the second set of statistics may be collected by querying the one or more data sources 104 using one or more search strings. The first set of statistics and the second set of statistics may include, for example, a number of repositories associated with each topic tag and a topic tag URL associated with each of the first set of topics and the second set of human-labeled topic tags. Other examples of the first set of statistics and the second set of statistics may include, but are not limited to, a number of stars or likes associated with the corresponding topic tag, names of top authors associated with the corresponding topic tag, names of top contributors associated with the corresponding topic tag, and names of top organizations actively contributing to repositories associated with the corresponding topic tag.

Based on the collected second set of statistics, the processor 202 may be configured to generate a first topic table that may list the second set of human-labeled topics and the collected second set of statistics. By way of example, and not limitation, the first topic table is presented in table 9, as follows:

TABLE 9

First topic table

| Topic Tag | URL | 02/10/2021 | 02/17/2021 |
|---|---|---|---|
| Blockchain | abc.com/blockchain | 10,234 | 10,582 |
| Bitcoin | abc.com/bitcoin | 5,500 | 5,800 |
| Litecoin | abc.com/litecoin | 800 | 855 |
| Crypto-currency | abc.com/cryptocurreny | 2,486 | 3,012 |
| ... | ... | ... | ... |
| ... | ... | ... | ... |

In an embodiment, the processor 202 may be further configured to generate a second topic table, based on the collected first set of statistics. The second topic table may include each of the generated first set of topic tags (machine-generated), corresponding URLs, and a number of repositories associated each topic tag at different date/time stamps.

In an embodiment, the processor 202 may be configured to identify a first set of topic tags from a collection of topic tags stored on one or more web-based repository hosting systems 106. The identification of the first set of topic tags may be based on first popularity criteria. A number of repositories associated with each topic tag in the first set of topic tags may be above a threshold. For example, the first set of topic tags may include top 10 topic tags, each associated with at least 100 repositories (i.e. the threshold). Based on the identification of the first set of topic tags, the processor 202 may be configured to generate a topic tags trending table. The topic tags trending table may be updated at every interval (as per a schedule). The topic trending table may include the first set of topic tags, the corresponding URL of the topic tag, and a number of repositories associated the corresponding topic tag at each interval in the schedule. By way of example, and not limitation, a topic trending table is presented in Table 10, as follows:

TABLE 10

Topic Tags Trending Table

| Topic Tag | URL | 02/03/2021 | 02/10/2021 | 02/17/2021 |
|---|---|---|---|---|
| Blockchain | abc.com/blockchain | 12,120 | 12,345 | ... |
| Bitcoin | abc.com/bitcoin | 10,781 | 10,902 | ... |
| ... | ... | ... | ... | ... |

At 402I, a presentation data generation operation may be performed. The processor 202 may be configured to generate a set of presentation data based on one or more of the identified first set of repositories, the collected repository metadata, the generated first set of topic tags, the collected first set of statistics, and the collected second set of statistics.

For example, the presentation data may include graphical representation (such as graphs or charts), and/or textual representation of data associated with the identified first set of repositories and topic tags (machine generated and/or human-labeled). In an embodiment, the set of presentation data may be generated based on the watchlist table (which is based on the first plurality of tables and/or the second plurality of tables), the plurality of repository data tables, topic tables, and the topic tags trending table. In an embodiment, the presentation data may be generated based on the generated knowledge graph database.

At 402J, a presentation data rendering operation may be performed. In the rendering operation, the processor 202 may be configured to control the user device 114 to display the generated set of presentation data onto an electronic UI 118 of the user device 114.

Details about the presentation data rendering are provided, for example, in FIG. 7A, FIG. 7B, FIG. 7C, FIG. 7D, FIG. 7E, FIG. 7F, FIG. 7G, FIG. 8A, FIG. 8B, FIG. 8C, FIG. 8D, FIG. 8E, FIG. 8F, FIG. 9A, and FIG. 9B. It should be noted that data in Tables 1-10 is merely provided as an example and should not be construed as limiting for the disclosure.

Figure 5A:
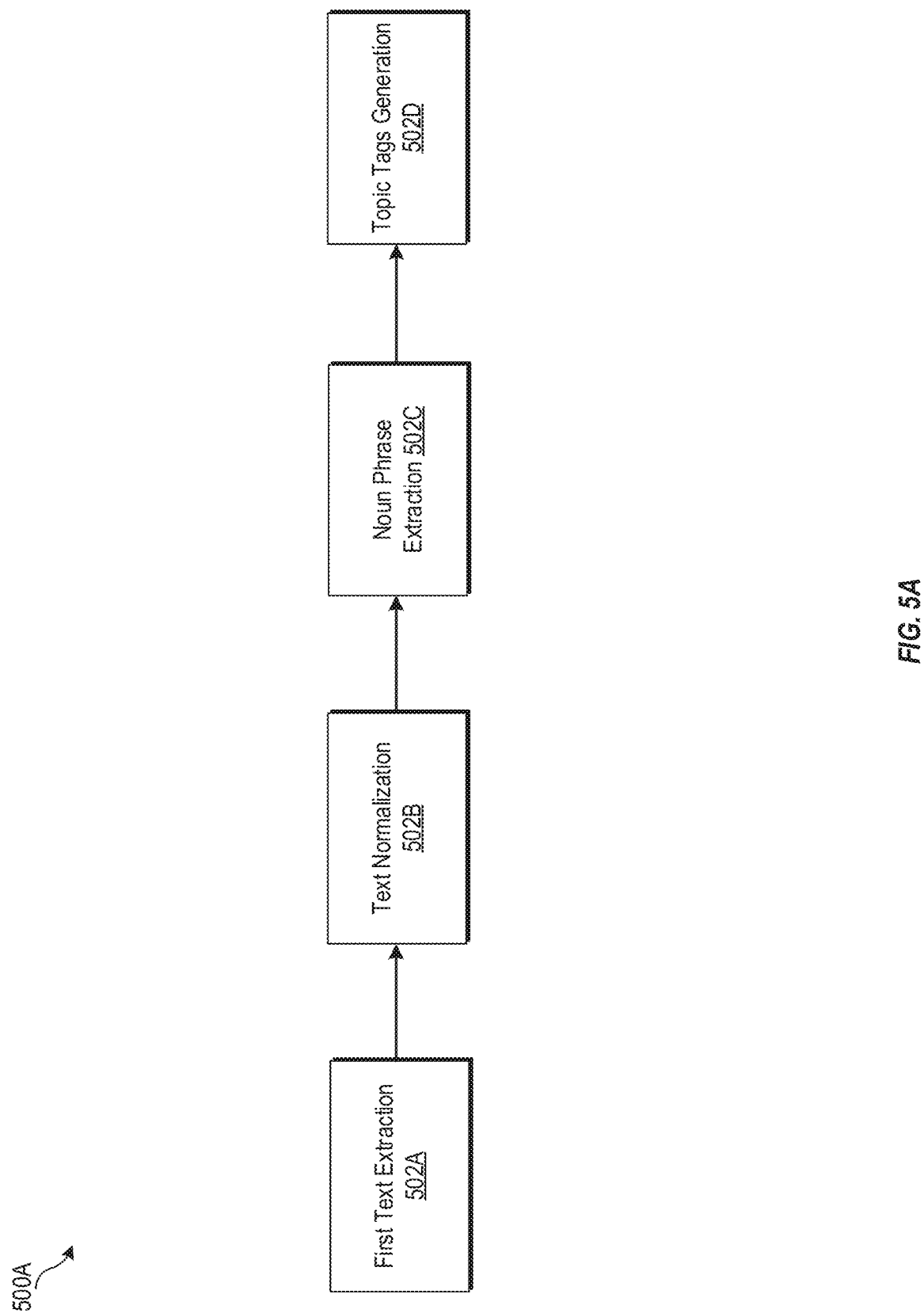
FIG. 5A depicts a block diagram that illustrates a first set of operations for generation of a first set of topic tags.

FIG. 5A depicts a block diagram that illustrates a first set of operations for generation of a first set of topic tags, in accordance with example embodiments. FIG. 5A is explained in conjunction with elements from FIG. 1, FIG. 2, FIG. 3, and FIG. 4. With reference to FIG. 5A, there is shown a set of exemplary operations 500A. The exemplary operations illustrated in the block diagram may be performed by any computing system, such as by the system 102 of FIG. 1 or by the processor 202 of FIG. 2.

At 502A, a first text extraction operation may be performed. In the first text extraction operation, the processor 202 may be configured to extract first text included in the first type of repository description (for example, in the repository data table of FIG. 4). The first type of repository description may include a short description or a brief summary about a repository (or a software code included in the repository). By way of example, and not limitation, the extracted first text for a repository with name "AbcLint" may be "Find and fix problems in your JavaScript code".

At 502B, a text normalization operation may be performed. The processor 202 may be configured to perform a text normalization operation on the extracted first text to generate a first normalized text. The text normalization operation may be performed to remove stop words, symbols, special characters, HTML tags, URL's, and before and after spaces from the extracted first text. In some embodiments, the text normalization operation may also include stemming and lemmatization operations. Stemming operation may correspond to a process of reducing inflection in words of the extracted first text to their root form. By way of example, and not limitation, during the process of stemming, words like 'troubles' and 'troubled' may be reduced to 'trouble'. As another example, the words like 'connect', 'connected', 'connection', 'connections', 'connects' may be reduced to 'connect' during stemming. Similarly, the lemmatization operation may correspond a process of grouping together different inflected forms of a word so they can be analysed as a single item. By way of example, and not limitation, during the process of lemmatization, word like 'rocks' may be reduced to 'rock'. As another example, the word 'corpora' may be reduced to 'corpus'.

At 502C, a noun phrase extraction operation may be performed. The processor 202 may be configured to extract a set of noun phrases from the first normalized text. The set of noun phrases may be extracted by using the one or more natural language processing-based methods on the first normalized text. Examples of the one or more natural language processing-based methods may include, but are not limited to, a term frequency-inverse document frequency (TF-IDF) method, a bag-of-words method, an N-gram co-occurrences method, a rapid automatic keyword extraction (RAKE) method, a conditional random fields method, other graph-based methods, or machine learning-based methods, all of which may be electronically implemented.

At 502D, a topic tags generation operation may be performed. The processor 202 may be configured to generate a first set of topic tags from the extracted set of noun phrases. To generate the first set of topic tags, the processor 202 may be configured to update the extracted set of noun phrases by removing one or more duplicate instances of the noun phase from the extracted set of noun phrases. The updated set of noun phrases may be included as topic tags in the first set of topic tags.

Figure 5B:
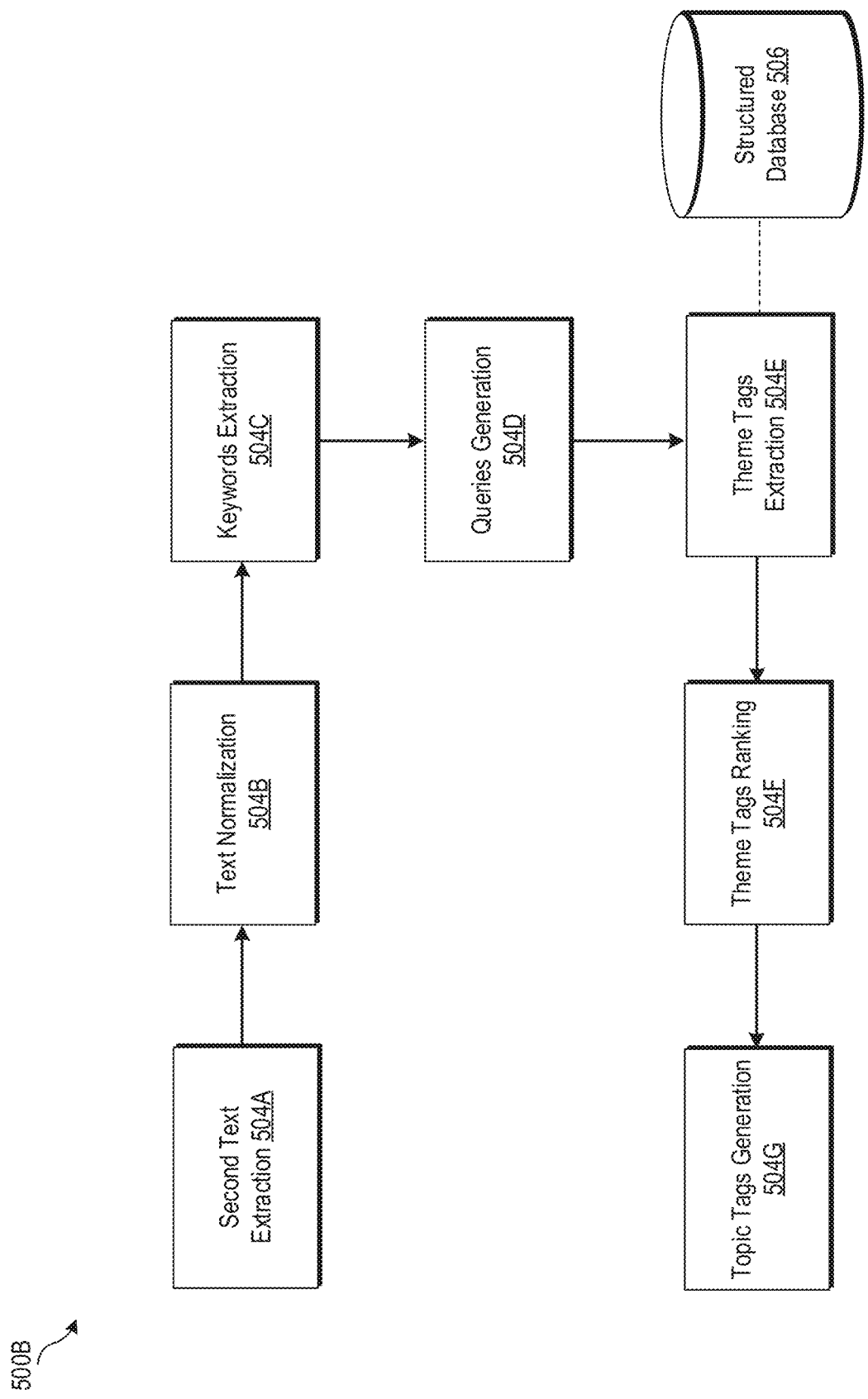
FIG. 5B depicts a block diagram that illustrates a second set of operations for generation of the first set of topic tags.

FIG. 5B depicts a block diagram that illustrates a second set of operations for generation of the first set of topic tags, in accordance with example embodiments. FIG. 5B is explained in conjunction with elements from FIG. 1, FIG. 2, FIG. 3, FIG. 4, and FIG. 5A. With reference to FIG. 5B, there is shown a set of exemplary operations 500B. The exemplary operations illustrated in the block diagram may be performed by any computing system, such as by the system 102 of FIG. 1 or by the processor 202 of FIG. 2.

At 504A, a second text extraction operation may be performed. The processor 202 may be configured to extract second text included in the second type of repository description (for example, in the repository data table of FIG. 4). The second type of repository description may be a long description about the repository in the form of a readme file. By way of example, and not limitation, the extracted second text for the repository with name "AbcLint" may be "AbcLint is a tool for identifying and reporting on patterns found in ECMAScript/JavaScript code. In many ways, it is similar to JSLint and JSHint with a few exceptions: AbcLint uses Aspree for JavaScript parsing, AbcLint uses an AST to evaluate patterns in code, and AbcLint is completely pluggable, every single rule is a plugin and you can add more at runtime . . . ".

At 504B, a text normalization operation may be performed. In the text normalization operation, the processor 202 may be configured to performing a text normalization operation on the extracted second text to generate a second normalized text. The text normalization operation may be performed to remove stop words, symbols, special characters, HTML tags, URLs, and before and after spaces from the extracted second text. In some embodiments, the text normalization operation may also include stemming and lemmatization (as discussed, for example, in FIG. 5A).

At 504C, a keywords extraction operation may be performed. The processor 202 may be configured to extract a group of keywords from the second normalized text by application of a machine learning-based topic modelling method on the second normalized text. The machine learning-based topic modelling method may be one of the one or more natural language processing-based methods.

In some embodiments, topic modelling may refer to a process of logically selecting keywords that belong to a certain topic from within the second normalized text. An advantage of using the topic modelling methods is that such methods may rely on unsupervised machine learning techniques. The topic modelling methods may be capable of inferring patterns and cluster similar expressions without a need to define topic tags or train data beforehand. Examples of methods for topic modelling may include, but are not limited to, a Latent Dirichlet Allocation (LDA) method, a non-Negative Matrix Factorization (NMF) method, a Latent Semantic Analysis (LSA) method, a Parallel Latent Dirichlet Allocation (PLDA) method, a Pachinko Allocation Model (PAM)-based method, and deep learning-based method such as Lda2vec.

The LDA may be a statistical and graphical model and may be developed using a variational Exception Maximization (VEM) algorithm. The NMF method may be a matrix factorization method and may be based on linear algebra. The LSA may use a singular value decomposition (SVD) on the Document-Term Matrix and may be based on Linear Algebra. The PLDS method may be based on probability distribution method. The PAM method may be an improved version of LDA and may improvise by modelling correlation between keywords. The deep learning-based method such as Lda2vec may be an extension of word2vec and LDA that jointly learns word, document, and topic vectors. The detailed implementation of the aforementioned topic modelling methods may be known to one skilled in the art; therefore, a detailed description of such aforementioned topic modelling methods has been omitted from the disclosure for the sake of brevity.

At 504D, a queries generation operation may be performed. The processor 202 may be configured to generate one or more queries using the extracted group of keywords. The generated one or more queries may be used to query a structured database 506. In an embodiment, each of the one or more queries may be a 'select' query associated with one or more keywords of the group of keywords. Such queries may be generated by using a Cypher Query Language or RDF (Resource Description Framework) Query Language (SPARQL) language, for example.

At 504E, a theme tags extraction operation may be performed. The processor 202 may be configured to extract a set of theme tags by querying the structured database 506 using the generated one or more queries. An example of the structured database 506 is DBpedia®. In some instances, the keywords (used in queries) and the extracted theme tags may have an ontological relationship. For example, the theme tags may identify a group of keywords using a broad concept. For example, if a first keyword is 'processor', a second keyword is 'database' a third keyword may be 'schema' and the fourth keyword may be 'data-analysis', then the extracted set of theme tag may include a first theme tag as 'information processing', a second theme tag as 'data-processor', and a third theme tag as 'database system'.

At 504F, a theme tags ranking operation may be performed. The processor 202 may be configured to rank the extracted set of theme tags based on a tag relevancy score associated with each of the extracted set of theme tags. With reference to the foregoing example, the tag relevancy score associated with the first theme tag may be higher than the tag relevancy scores associated the second theme tag and the third theme tag. Similarly, the tag relevancy score associated with the third theme tag may be higher than the tag relevancy score associated the second theme tag and lower than the tag relevancy score of the first theme tag. In an embodiment, the tag relevancy score associated with each theme tag may be included in results of the query (at 504E).

At 504G, a topic tags generation operation may be performed. The processor 202 may be configured to extract a subset of the ranked set of theme tags. The extracted subset may be included as topic tags in the first set of topic tags. For example, top-10 theme tags, within the ranked set of theme tags, with a tag relevancy score above a threshold may be included as the topic tags in the first set of topic tags.

Figure 6:
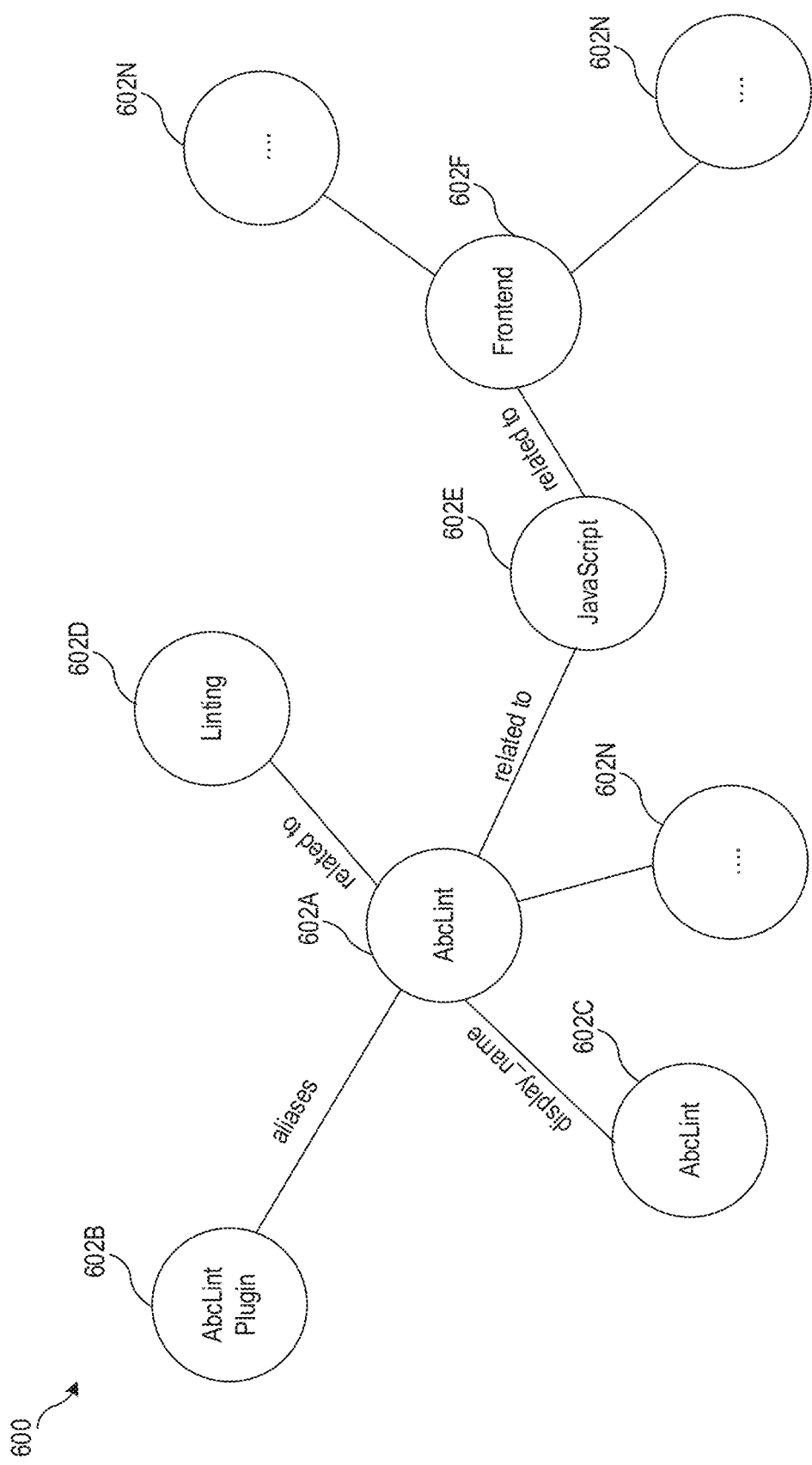
FIG. 6 is a diagram that depicts an exemplary knowledge graph database.

FIG. 6 is a diagram that depicts an exemplary knowledge graph database, according to at least one embodiment described in the present disclosure. FIG. 6 is explained in conjunction with elements from FIG. 1, FIG. 2, FIG. 3, FIG. 4, FIG. 5A, and FIG. 5B. With reference to FIG. 6, there is shown a knowledge graph database 600. In an embodiment, the knowledge graph database 600 may be generated based on the collected topic metadata and the collected second set of human-labeled topic tags.

With reference to the knowledge graph database 600, there is shown a set of entities 602. Such entities may be associated with the collection of repositories 110. The set of entities may include, for example, a first entity 602A, a second entity 602B, a third entity 602C, a fourth entity 602D, a fifth entity 602E, a sixth entity 602F, and other entities 602N. Each entity of the set of entities may represent, for example, an application area of software code in a repository, a programming language, a title of repository, a technology, a keyword (from description of repository), a field of the repository metadata, and the like.

By way of example, and not limitation, the first entity 602A may represent the name of the exemplary topic (i.e. "AbcLint"). The second entity 602B represent an alias for the exemplary repository. The alias for the exemplary topic may be determined from the collected topic tag metadata. The third entity 602C may represent a display name for the exemplary topic. The display name for the exemplary topic may be determined from the collected topic metadata, as described at 402B in FIG. 4. The fourth entity 602D may represent a related topic tag name. The related topic tag name may be determined from the collected topic tag metadata. The fifth entity 602E may represent a programming language associated with software code or the code snippet included in the exemplary repository. The programming language associated with software code or the code snippet included in the exemplary repository may be determined based on the second set of human-labeled topic tags. The sixth entity 602F may represent a technology related to the programming language depicted in the fifth entity 602E. The other entities 602N may represent parameters included in the collected topic metadata and/or the collected second set of human-labeled topic tags.

There is further shown a relationship between the set of entities. Each entity may be referred to a node, which may be related to one or more nodes (i.e. entities) using edges (i.e. represented as lines connecting two nodes). By way of example, a first relation between the first entity 602A and the second entity 602B may be represented as "aliases". A second relation between the first entity 602A and the third entity 602C may be represented as "display_name". A third relation between the first entity 602A and the fourth entity 602D may be represented as "related to". A fourth relation between the first entity 602A and the fifth entity 602E may be represented as "related to". Similarly, a sixth relation between the fifth entity 602E and the sixth entity 602F may be represented as "related to".

Figure 7A:
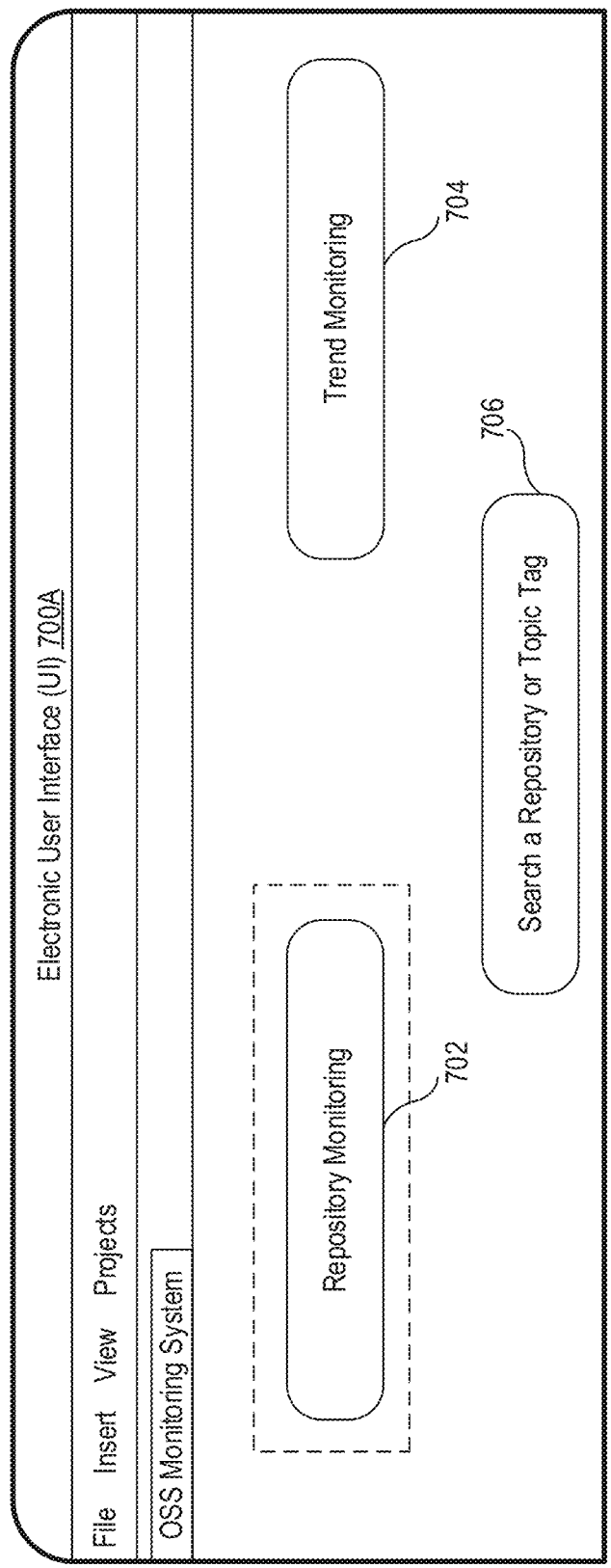
FIG. 7A is a diagram that illustrates an exemplary electronic user interface for displaying presentation data.

FIG. 7A is a diagram that illustrates an exemplary electronic user interface for displaying presentation data, according to at least one embodiment described in the present disclosure. FIG. 7A is explained in conjunction with elements from FIG. 1, FIG. 2, FIG. 3, FIG. 4, FIG. 5A, FIG. 5B, and FIG. 6. With reference to FIG. 7A, there is shown an exemplary electronic UI 700A, which may be an exemplary implementation of the electronic UI 118 of FIG. 1.

The exemplary electronic UI 700A may be displayed on the user device 114 based on a user request, which may be received via an application interface displayed onto a display screen of the user device 114. The application interface may be part of an application software, for example, a software development kit (SDK), a cloud server-based application, a web-based application, an OS-based application/application suite, an enterprise application, a mobile application, and the like.

On the exemplary electronic UI 700A, there is shown a first set of UI elements, such as a first UI element 702, a second UI element 704, and a third UI element 706. The first UI element 702 may be labeled as "Repository Monitoring", the second UI element 704 may be labeled as "Trend Monitoring", and the third UI element 706 may be labeled as "Search a Repository or Topic Tag". Each of the first UI element 702, the second UI element 704, and the third UI element 706 may be rendered as a button (which can be selected using an I/O device).

The first UI element 702 may be used for displaying a repository-based trend monitoring interface on the electronic UI. The second UI element 704 may be used for displaying a topic-based trend monitoring interface on the electronic UI. The third UI element 706 may be used for displaying a search interface on the electronic UI. Details about the topic-based trend monitoring interface are provided, for example, in FIG. 8B, FIG. 8C, FIG. 8D, FIG. 8E, and FIG. 8F. Details about the search interface are provided, for example in FIG. 9B.

In an embodiment, the processor 202 may receive a first user input for selection of the first UI element 702 (as depicted by the dotted rectangle). Based on the selection of the first UI element 702, an exemplary electronic UI 700B may be rendered on the display screen of the user device 114. Details about the exemplary electronic UI 700B are provided, for example, in FIG. 7B.

Figure 7B:
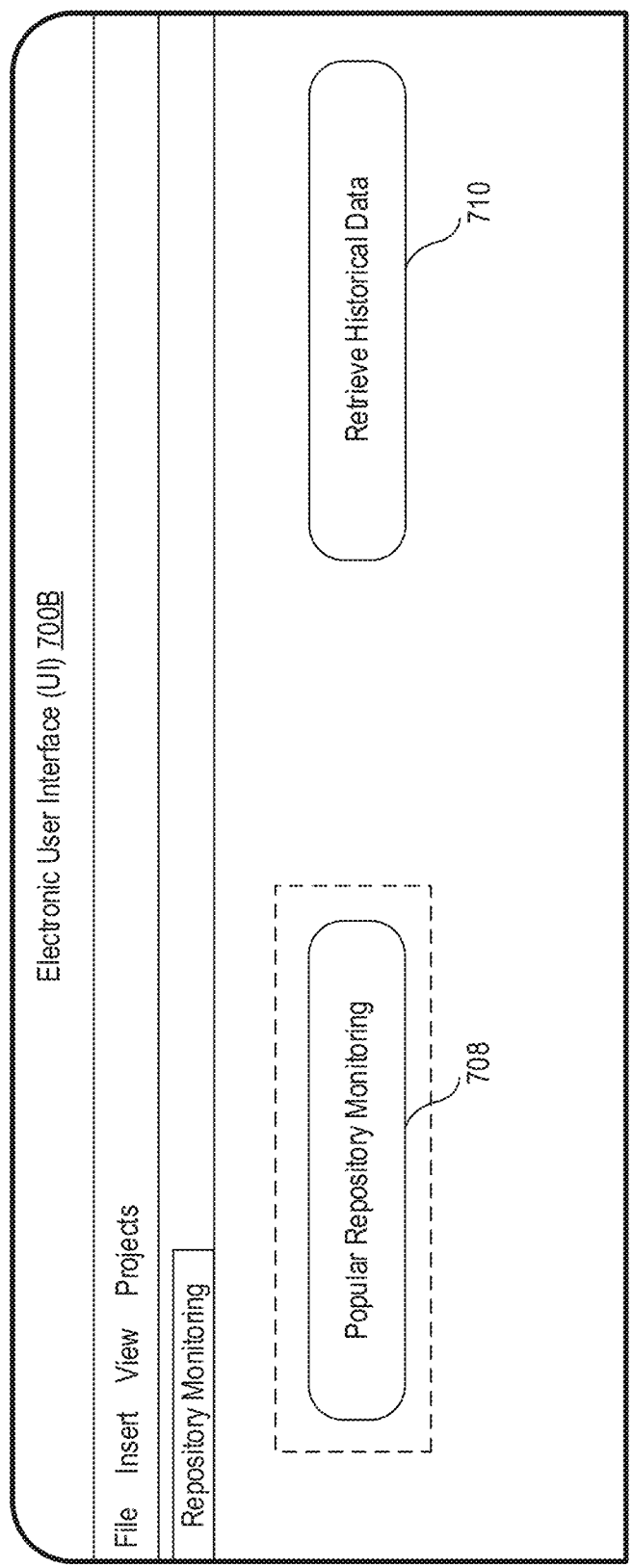
FIG. 7B is a diagram that illustrates an exemplary electronic user interface for repository monitoring.

FIG. 7B is a diagram that illustrates an exemplary electronic user interface for repository monitoring, according to at least one embodiment described in the present disclosure. FIG. 7B is explained in conjunction with elements from FIG. 1, FIG. 2, FIG. 3, FIG. 4, FIG. 5A, FIG. 5B, FIG. 6, and FIG. 7A. With reference to FIG. 7B, there is shown an exemplary electronic UI 700B, which may be an exemplary implementation of the electronic UI 118 of FIG. 1. The exemplary electronic UI 700B may be displayed on the user device 114 based on the selection of the first UI element 702 in FIG. 7A. The selection may be received via the user device 114.

On the exemplary electronic UI 700B, there is shown a second set of UI elements, such as a fourth UI element 708 and a fifth UI element 710. The fourth UI element 708 may be labeled as "Popular Repository Monitoring" and may be a button. Similarly, the fifth UI element 710 may be labeled as "Retrieve Historical Data" and may be a button.

In an embodiment, a second user input may be received for selection of the fourth UI element 708 (as depicted by the dotted rectangle). Based on the selection of the fourth UI element 708, an exemplary electronic UI 700C may be rendered on the display screen of the user device 114. Details about the exemplary electronic UI 700C are provided, for example, in FIG. 7C.

In an embodiment, the second user input may be received for selection of the fifth UI element 710. Based on the selection of the fifth UI element 710, an exemplary electronic UI 700G may be rendered on the display screen of the user device 114. Details about the exemplary electronic UI 700G are provided, for example, in FIG. 7G.

Figure 7C:
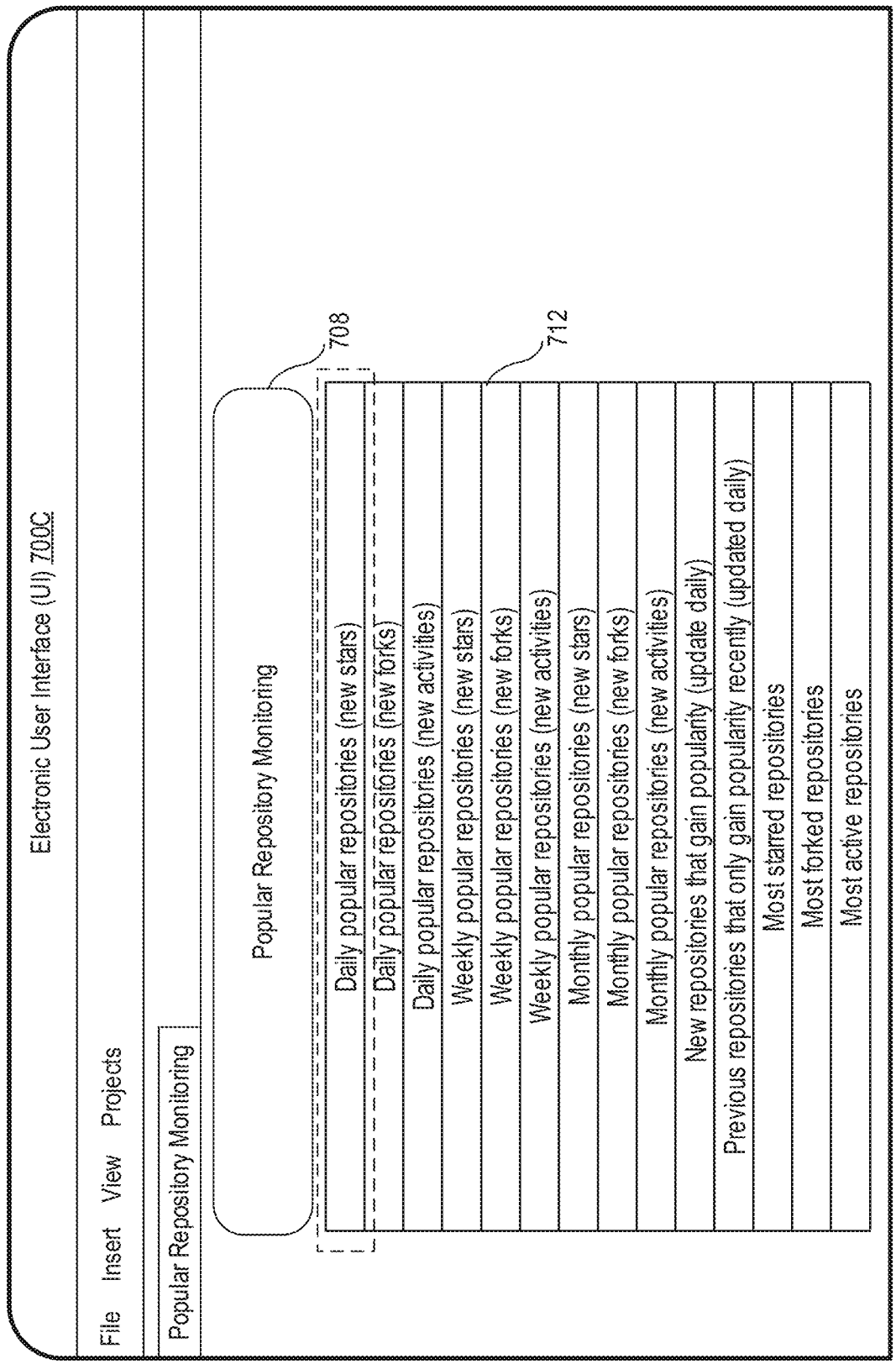
FIG. 7C is a diagram that illustrates an exemplary electronic user interface for popular repository monitoring.

FIG. 7C is a diagram that illustrates an exemplary electronic user interface for popular repository monitoring, according to at least one embodiment described in the present disclosure. FIG. 7C is explained in conjunction with elements from FIG. 1, FIG. 2, FIG. 3, FIG. 4, FIG. 5A, FIG. 5B, FIG. 6, FIG. 7A, and FIG. 7B. With reference to FIG. 7C, there is shown an exemplary electronic UI 700C, which may be an exemplary implementation of the electronic UI 118 of FIG. 1. The exemplary electronic UI 700C may be displayed on the user device 114 based on the selection of the fourth UI element 708 in FIG. 7B. The selection may be received via the user device 114.

On the exemplary electronic UI 700C, there is shown a sixth UI element 712 that may be a drop down list and may include a list of options. The list of options may include options to view, for example, daily popular repositories (new stars), daily popular repositories (new forks), daily popular repositories (new activities), weekly popular repositories (new stars), weekly popular repositories (new forks), weekly popular repositories (new activities), monthly popular repositories (new stars), monthly popular repositories (new forks), monthly popular repositories (new activities), new repositories that have gained popularity (updated daily), old repositories that have only gained popularity recently (updated daily), most starred repositories, most forked repositories, and most active repositories (in terms of updates/contributions/discussions).

In an embodiment, a third user input may be received for selection of a first option (from the list of options) included in the sixth UI element 712 (as depicted by the dotted rectangle). Based on the selection of the first option, an exemplary electronic UI 700D may be rendered on the display screen of the user device 114. Details about the exemplary electronic UI 700D are provided, for example, in FIG. 7D.

Figure 7D:
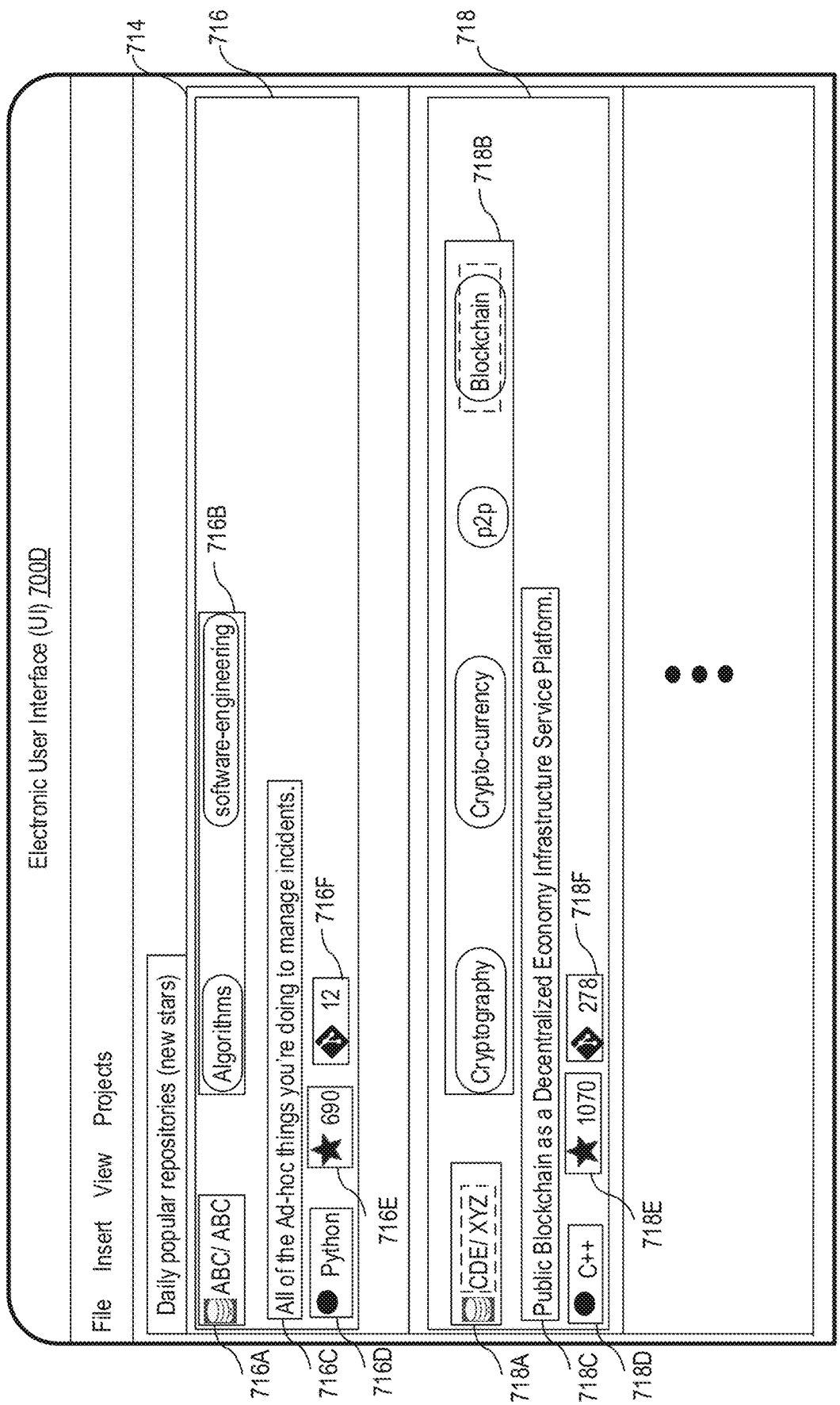
FIG. 7D is a diagram that illustrates an exemplary electronic user interface for daily popular repositories (new stars) based on selection of the first option from the list of options included in the sixth UI element in FIG. 7C.

FIG. 7D is a diagram that illustrates an exemplary electronic user interface for daily popular repositories (new stars) based on selection of the first option from the list of options included in the sixth UI element in FIG. 7C, according to at least one embodiment described in the present disclosure. FIG. 7D is explained in conjunction with elements from FIG. 1, FIG. 2, FIG. 3, FIG. 4, FIG. 5A, FIG. 5B, FIG. 6, FIG. 7A, FIG. 7B, and FIG. 7C. With reference to FIG. 7D, there is shown an exemplary electronic UI 700D, which may be an exemplary implementation of the electronic UI 118 of FIG. 1. The exemplary electronic UI 700D may be displayed on the user device 114 based on the selection of the first option, included in the sixth UI element 712 (in FIG. 7C). The selection may be received via the user device 114.

In FIG. 7D, there is shown a first portion of the generated presentation data. The details about generation of the presentation data are provided in FIG. 4, for example. The first portion may be displayed on a seventh UI element 714 of the exemplary electronic UI 700D. The first portion may include a list of daily popular repositories that may have gained new stars/likes. In an embodiment, the seventh UI element 714 may also be referred as the repository-based trend monitoring interface on the exemplary electronic UI 700D.

By way of example, and not limitation, the seventh UI element 714 may be divided into a first section and a second section. Details associated with a first popular repository (ABC/ABC) may be displayed on the first section and details associated with a second popular repository (CDE/XYZ) may be displayed on the second section of the seventh UI element 714. The first set of UI elements 716 may include, for example, a first name UI element 716A, a first topic tag UI element 716B, a first description UI element 716C, a first programming language UI element 716D, a first star count UI element 716E, and a first fork count UI element 716F.

In the first name UI element 716A, a name of the first popular repository may be displayed. As shown, for example, the name of the first popular repository is "ABC/ABC". In the first topic tag UI element 716B, a set of topic tags associated with the first popular repository may be displayed. The set of topic tags may include both the generated first set of topic tags (machine-generated) and the second set of human-labeled topic tags for the first popular repository. In the first description UI element 716C, the first type of repository description associated with the first popular repository may be displayed. In the first programming language UI element 716D, the programming language used in the code snippet or the software code (included in the first popular repository) may be displayed. In the first star count UI element 716E, a count of the stars associated with the first popular repository repository may be displayed. In the first fork count UI element 716F, a count of the forks (or downloads) of the first popular repository repository may be displayed. Each of the first set of UI elements 716 may be user-selectable UI elements.

The second set of UI elements 718 may include a second name UI element 718A, a second topic tag UI element 718B, a second description UI element 718C, a second programming language UI element 718D, a second star count UI element 718E, and a second fork count UI element 716F.

In the second name UI element 718A, a name of the second popular repository may be displayed. As shown, for example, the name of the second popular repository is "CDE/XYZ". In the second topic tag UI element 718B, a set of topic tags associated with the second popular repository may be displayed. The set of topic tags may include both the generated first set of topic tags and the second set of human-labeled topic tags associated with the second popular repository. In the second description UI element 718C, the first type of repository description associated with the second popular repository may be displayed. In the second programming language UI element 718D, the programming language used in the code snippet or the software code (included in the second popular repository) may be displayed. In the second star count UI element 718E, a count of the stars associated with the second popular repository may be displayed. In the second fork count UI element 718F, a count of the forks associated with the second popular repository may be displayed. Each of the second set of UI elements 718 may be user-selectable UI elements.

In an embodiment, each of the first name UI element 716A, the first topic tag UI element 716B, the first description UI element 716C, the first programming language UI element 716D, the first star count UI element 716E, and the first fork count UI element 716F may be referred to as a first linked item. The first linked items may be included in the displayed first portion of the set of presentation data and may be associated with the first popular repository. Similarly, each of the second name UI element 718A, the second topic tag UI element 718B, the second description UI element 718C, the second programming language UI element 718D, the second star count UI element 718E, and the second fork count UI element 718F may be referred to as a second linked item. The second linked items may be included in the displayed first portion of the set of presentation data and associated with the second popular repository.

In an embodiment, at a first time, a fourth user input may be received. The fourth user input may correspond to a selection of the second linked item (such as the second name UI element 718A) (i.e. "CDE/XYZ") included in the displayed first portion of the set of presentation data. Based on the reception of the fourth user input, an exemplary electronic UI 700E may be displayed. The details about the exemplary electronic UI 700E are provided, for example, in FIG. 7E.

In an embodiment, at a second time, a fifth user input may be received. The fifth user input may correspond to selection of the second linked item. The second linked item (such as at least one topic tag (e.g., Blockchain) displayed in the second topic tag UI element 718B) may be included in the displayed first portion of the set of presentation data. Based on the reception of the fifth user input, an exemplary electronic UI 700F may be displayed. The details about the exemplary electronic UI 700F are provided, for example, in FIG. 7F.

Figure 7E:
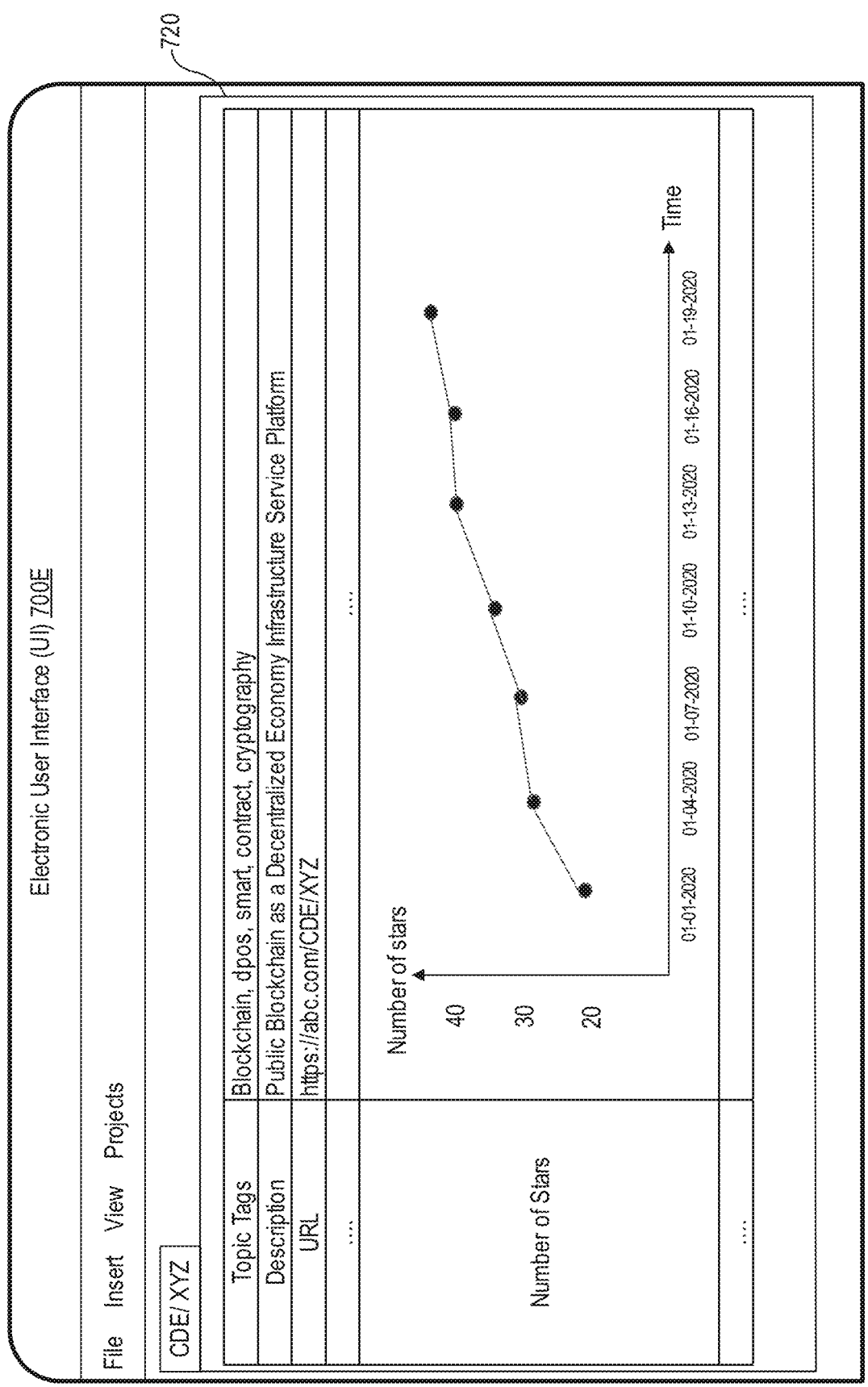
FIG. 7E is a diagram that illustrates an exemplary electronic user interface for displaying content of a linked item.

FIG. 7E is a diagram that illustrates an exemplary electronic user interface for displaying content of a linked item, according to at least one embodiment described in the present disclosure. FIG. 7E is explained in conjunction with elements from FIG. 1, FIG. 2, FIG. 3, FIG. 4, FIG. 5A, FIG. 5B, FIG. 6, FIG. 7A, FIG. 7B, FIG. 7C, and FIG. 7D. With reference to FIG. 7E, there is shown an exemplary electronic UI 700E, which may be an exemplary implementation of the electronic UI 118 of FIG. 1.

Within the exemplary electronic UI 700E, there is shown a second portion of the generated set of presentation data on an eighth UI element 720. In an embodiment, the second portion may include a plurality of fields and corresponding values for the second popular repository with a repository name "CDX/XYZ". By way of example, and not limitation, a first field may be topic tags associated with the second popular repository. The topic tags may be blockchain, dpos (delegated proof of stake), smart, contract, and cryptography. A second field may the description associated with the second popular repository. The description may be "Public Blockchain as a Decentralized Economy Infrastructure Service Platform". A third field may be a URL associated with the second popular repository. The URL may be "https://abc.com/CDE/XYZ".

It should be noted that the URL associated with the second popular repository may correspond to a directory of a web hosting system on which the second popular repository is hosted. In an embodiment, the eighth UI element 720 may also include graphs and/or charts, as part of the set of presentation data. For example, a graph is shown representing changes in the number of stars/likes for the second popular repository at different time intervals. A person of ordinary skill in the art will understand that there may be other fields associated with the second popular repository, in addition to the fields shown in FIG. 7E. A detailed description for other fields and corresponding values has been omitted from the disclosure for the sake of brevity.

Figure 7F:
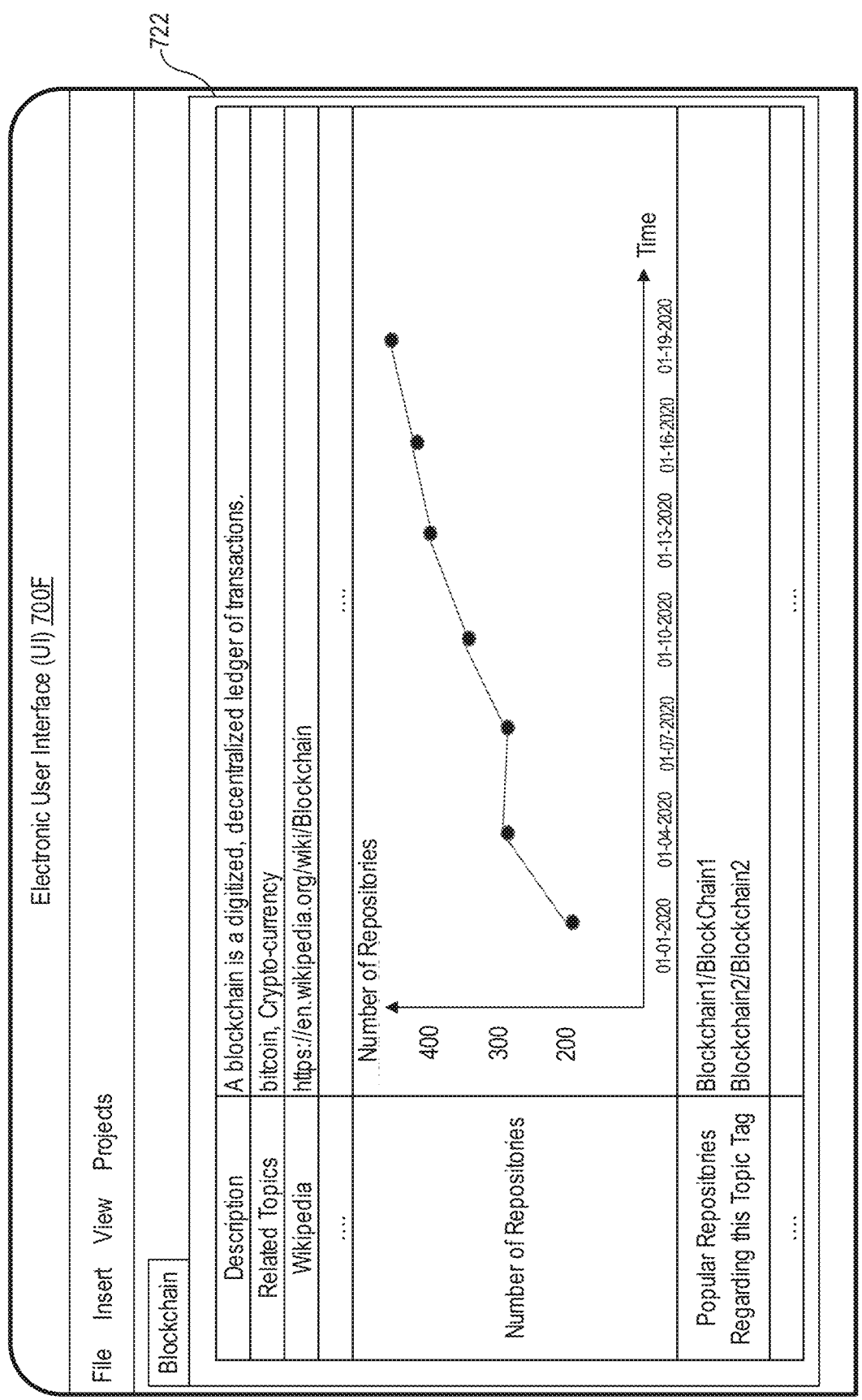
FIG. 7F is a diagram that illustrates an exemplary electronic user interface for displaying content of a linked item.

FIG. 7F is a diagram that illustrates an exemplary electronic user interface for displaying content of a linked item, according to at least one embodiment described in the present disclosure. FIG. 7F is explained in conjunction with elements from FIG. 1, FIG. 2, FIG. 3, FIG. 4, FIG. 5A, FIG. 5B, FIG. 6, FIG. 7A, FIG. 7B, FIG. 7C, FIG. 7D, and FIG. 7E. With reference to FIG. 7F, there is shown an exemplary electronic UI 700F, which may be an exemplary implementation of the electronic UI 118 of FIG. 1.

Within the exemplary electronic UI 700F, there is shown a second portion of the generated set of presentation data on a ninth UI element 722. In an embodiment, the second portion may include a plurality of fields and corresponding values for a first topic tag (Blockchain). By way of example, and not limitation, a first field may be the description of the first topic tag. The description may be "A blockchain is a digitized, decentralized ledger of transactions". A second field may be topic tags related to the first topic tag (Blockchain). The second field may include bitcoin and cryptocurrency. A third field may be a URL to access details about the first topic tag. The URL may be "https://en.wikipedia.org/wiki/Blockchain". A fourth field may be names of popular repositories associated with the first topic tag. The names may be Blockchain1/BlockChain1 and Blockchain2/Blockchain2.

In an embodiment, the ninth UI element 722 may also include graphs and/or charts. For example, a graph is shown representing changes in the number of repositories associated with the first topic tag at different time intervals. A person of ordinary skill in the art will understand that there may be additional number of fields and corresponding values associated with the first topic tag, in addition to the fields shown in FIG. 7f. A detailed description for the other fields associated with first topic tag has been omitted from the disclosure for the sake of brevity.

Figure 7G:
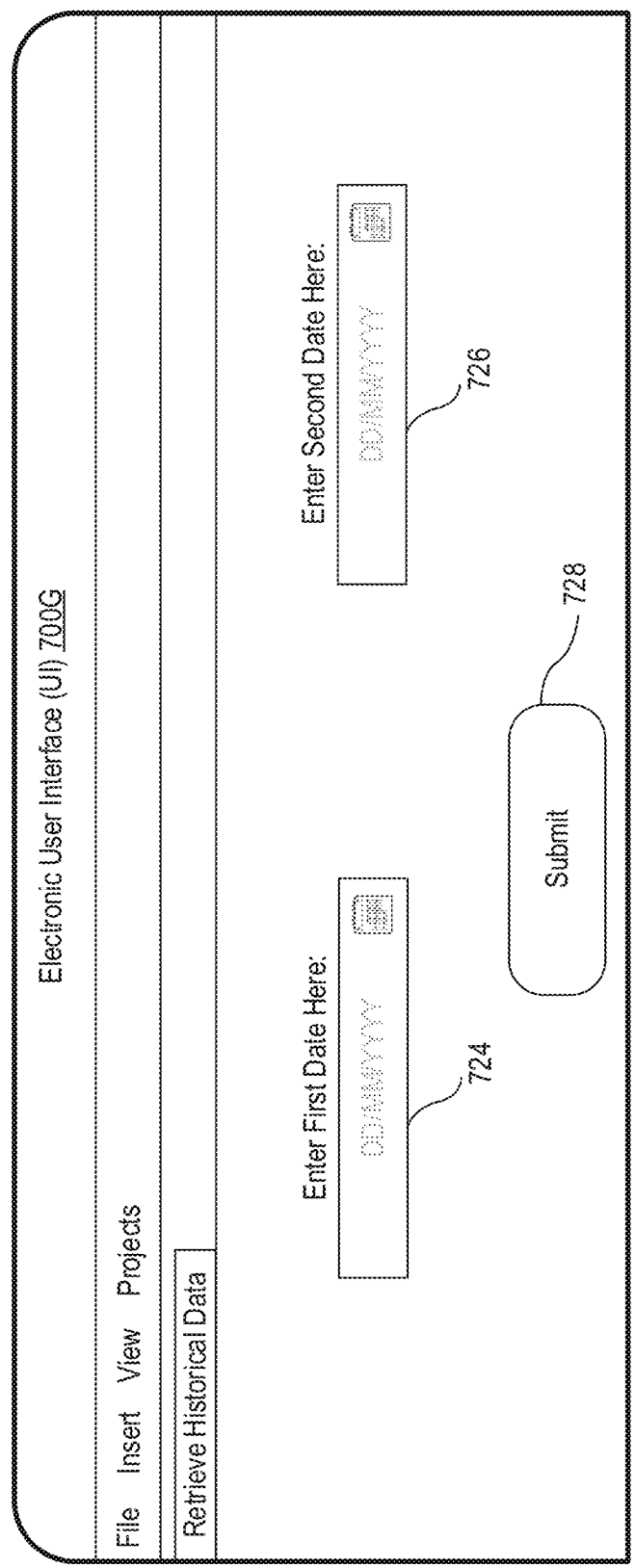
FIG. 7G is a diagram that illustrates an exemplary electronic user interface for retrieving historical data based on selection of a UI element.

FIG. 7G is a diagram that illustrates an exemplary electronic user interface for retrieving historical data based on selection of a UI element, according to at least one embodiment described in the present disclosure. FIG. 7G is explained in conjunction with elements from FIG. 1, FIG. 2, FIG. 3, FIG. 4, FIG. 5A, FIG. 5B, FIG. 6, FIG. 7A, FIG. 7B, FIG. 7C, FIG. 7D, FIG. 7E, and FIG. 7F. With reference to FIG. 7G, there is shown an exemplary electronic UI 700G, which may be an exemplary implementation of the electronic UI 118 of FIG. 1.

The exemplary electronic UI 700G may be displayed on the user device 114 based on the selection of the fifth UI element 710 (in FIG. 7B). The selection may be received via the user device 114. The exemplary electronic UI 700G may be used to retrieve historical data about the repositories between a first date and a second date.

With reference to FIG. 7G, there is shown a tenth UI element 724, an eleventh UI element 726, and a twelfth UI element 728. The tenth UI element 724 may be used to enter a first date and the eleventh UI element 726 may be used to enter a second date of an interval, for which the historical data may have to be retrieved. The twelfth UI element 728 may be labeled as 'submit' and may be a button.

After entering the first date and the second date, an electronic UI similar to the exemplary electronic UI 700C may be rendered on the user device 114. In an embodiment, if the interval is of 1 day, then daily popular repositories (new forks/downloads, new stars/likes, and new activities) may be displayed. In an embodiment, if the interval is of 1 week, then weekly popular repositories (new forks/downloads, new stars/likes, and new activities) may be displayed. In another embodiment, if the interval is of 9 days, then weekly popular repositories (new forks, new stars, and new activities) and daily popular repositories (new forks, new stars, and new activities) for two days may be merged together and then displayed. In case the interval is more than 3 months, then most starred repositories, most forked repositories, and most active repositories during the interval may be displayed.

Figure 8A:
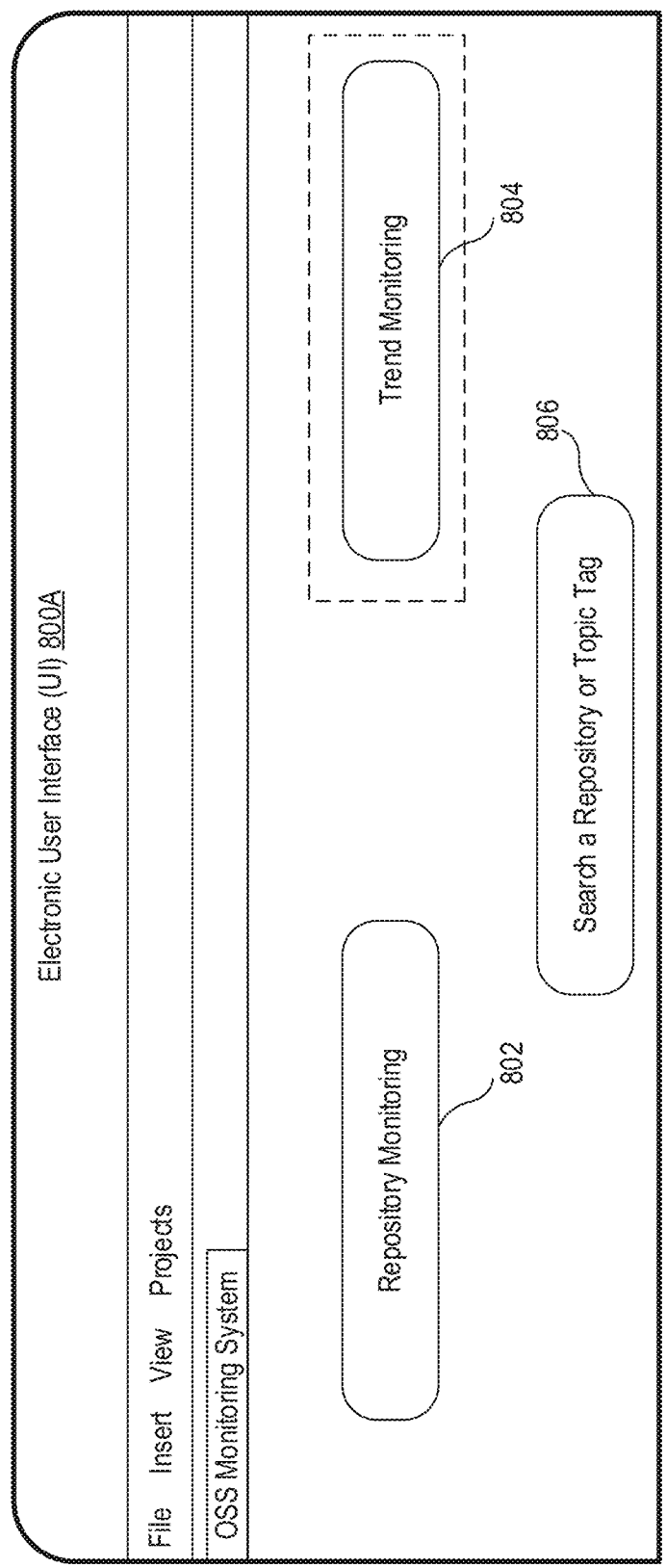
FIG. 8A is a diagram that illustrates an exemplary electronic user interface for displaying presentation data.

FIG. 8A is a diagram that illustrates an exemplary electronic user interface for displaying presentation data, according to at least one embodiment described in the present disclosure. FIG. 8A is explained in conjunction with elements from FIG. 1, FIG. 2, FIG. 3, FIG. 4, FIG. 5A, FIG. 5B, FIG. 6, FIG. 7A, FIG. 7B, FIG. 7C, FIG. 7D, FIG. 7E, FIG. 7F, and FIG. 7G. With reference to FIG. 8A, there is shown an exemplary electronic UI 800A, which may be an exemplary implementation of the electronic UI 118 of FIG. 1.

The exemplary electronic UI 800A may be displayed on the user device 114 based on a user request, which may be received via an application interface displayed onto a display screen of the user device 114. The application interface may be part of an application software, for example, a software development kit (SDK), a cloud server-based application, a web-based application, an OS-based application/application suite, an enterprise application, or a mobile application.

On the exemplary electronic UI 800A, there is shown a first set of UI elements, such as a first UI element 802, a second UI element 804, and a third UI element 806. The first UI element 802 may be labeled as "Repository Monitoring" and may be a button. The second UI element 804 may be labeled as "Trend Monitoring" and may also be a button. Similarly, the third UI element 806 may be labeled as "Search a Repository or Topic Tag" and may also be a button.

The first UI element 802 may be used for displaying the repository-based trend monitoring interface on the electronic UI, the second UI element 804 may be used for displaying the topic-based trend monitoring interface on the electronic UI, and the third UI element 806 may be used for displaying the search interface on the exemplary electronic UI 800A.

In an embodiment, a first user input may be received for selection of the second UI element 804 (as depicted by the dotted rectangle). Based on the selection of the second UI element 804, an exemplary electronic UI 800B may be rendered on the display screen of the user device 114. The details about the exemplary electronic UI 800B are provided, for example, in FIG. 8B.

Figure 8B:
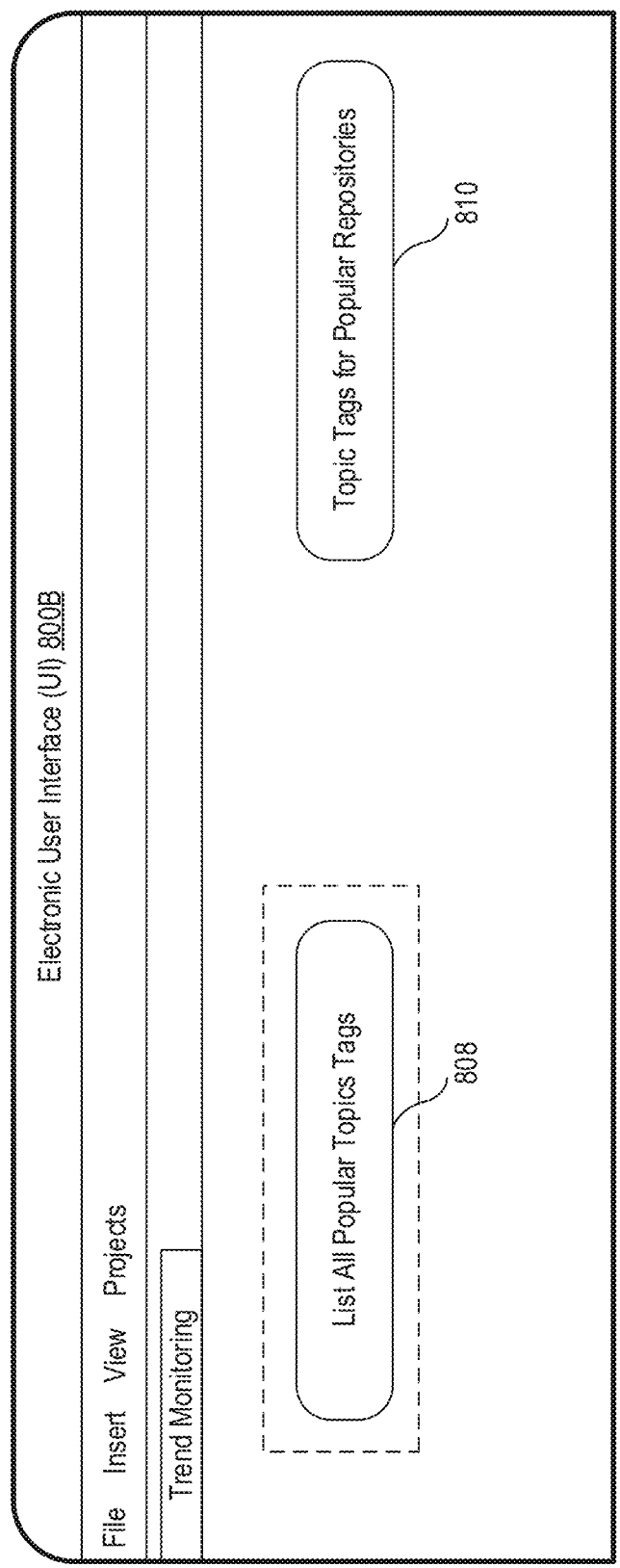
FIG. 8B is a diagram that illustrates an exemplary electronic user interface for trend monitoring based on selection of a UI element.

FIG. 8B is a diagram that illustrates an exemplary electronic user interface for trend monitoring based on selection of a UI element, according to at least one embodiment described in the present disclosure. FIG. 8B is explained in conjunction with elements from FIG. 1, FIG. 2, FIG. 3, FIG. 4, FIG. 5A, FIG. 5B, FIG. 6, FIG. 7A, FIG. 7B, FIG. 7C, FIG. 7D, FIG. 7E, FIG. 7F, FIG. 7G, and FIG. 8A. With reference to FIG. 8B, there is shown an exemplary electronic UI 800B, which may be an exemplary implementation of the electronic UI 118 of FIG. 1. The exemplary electronic UI 800B may be displayed on the user device 114 based on the selection of the second UI element 804 (in FIG. 7A). The selection may be received via the user device 114.

On the exemplary electronic UI 800B, there is shown a second set of UI elements, such as a fourth UI element 808 and a fifth UI element 810. The fourth UI element 708 may be labeled as "List All Popular Topics Tags" and may be a button. Similarly, the fifth UI element 810 may be labeled as "Topic Tags for Popular Repositories" and may also be a button.

In an embodiment, a second user input may be received for selection of the fourth UI element 808 (as depicted by the dotted rectangle). Based on the selection of the fourth UI element 808, an exemplary electronic UI 800C may be rendered on the display screen of the user device 114. The details about the exemplary electronic UI 800C are provided, for example, in FIG. 8C.

FIG. 8C is a diagram that illustrates an exemplary electronic user interface for displaying popular topic tags based on selection of a UI element, according to at least one embodiment described in the present disclosure. FIG. 8B is explained in conjunction with elements from FIG. 1, FIG. 2, FIG. 3, FIG. 4, FIG. 5A, FIG. 5B, FIG. 6, FIG. 7A, FIG. 7B, FIG. 7C, FIG. 7D, FIG. 7E, FIG. 7F, FIG. 7G, FIG. 8A, and FIG. 8B. With reference to FIG. 8C, there is shown an exemplary electronic UI 800C, which may be an exemplary implementation of the electronic UI 118 of FIG. 1.

Within the exemplary electronic UI 800C, there is shown a third portion of the generated set of presentation data on a sixth UI element 812. The sixth UI element 812 may be referred as a topic-based trend monitoring interface. In an embodiment, the third portion may correspond to a table associated with a list of all popular topic tags. The table may include at least five columns (say a first column, a second column, a third column, a fourth column, and a fifth column). The first column of the table may indicate a name of the topic tag. The second column may indicate a logo of the corresponding topic tag, a third column may indicate a short description about the corresponding topic tag. The fourth column may indicate a number of repositories associated with the corresponding column. Similarly, the fifth column may indicate a hyperlink to a metadata associated with the corresponding topic tag.

By way of example, and not limitation, the name of a first popular topic tag may be "Ansible". A short description associated with the first popular topic tag may be "Ansible is a simple and powerful automation engine". As shown, for example, there may be 2,355 repositories associated with the first popular topic tag.

In an embodiment, the exemplary electronic UI 800C may also include a compare UI element. The compare UI element may be selected to compare at least two topic tags of present in the table. The user 120 may be presented with one or more comparison options for comparing at least two topic tags. Such options may be rendered after the selection of the compare UI element.

Figure 8D:
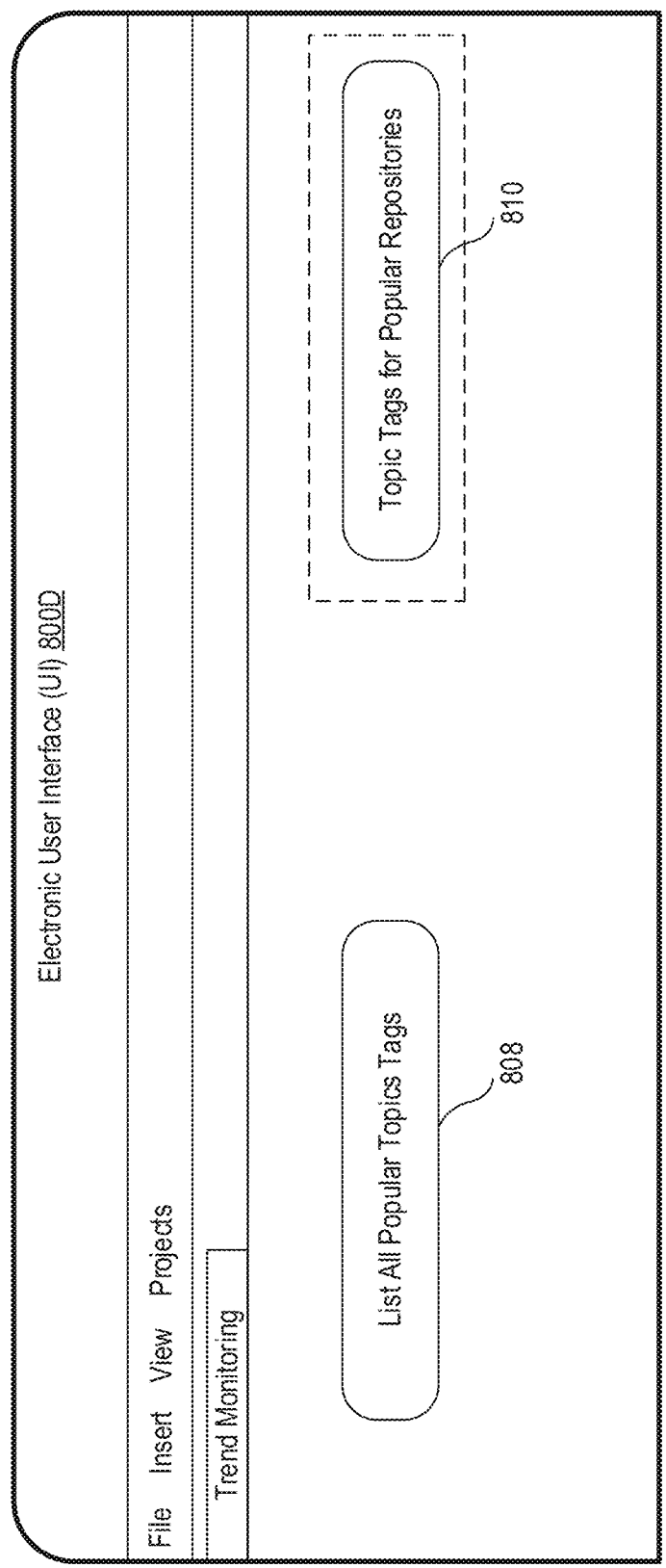
FIG. 8D is a diagram that illustrates an exemplary electronic user interface for trend monitoring based on selection of a UI element.

FIG. 8D is a diagram that illustrates an exemplary electronic user interface for trend monitoring based on selection of a UI element, according to at least one embodiment described in the present disclosure. FIG. 8D is explained in conjunction with elements from FIG. 1, FIG. 2, FIG. 3, FIG. 4, FIG. 5A, FIG. 5B, FIG. 6, FIG. 7A, FIG. 7B, FIG. 7C, FIG. 7D, FIG. 7E, FIG. 7F, FIG. 7G, FIG. 8A, FIG. 8B, and FIG. 8C. With reference to FIG. 8D, there is shown an exemplary electronic UI 800D, which may be an exemplary implementation of the electronic UI 118 of FIG. 1. The exemplary electronic UI 800D may be displayed on the user device 114 based on the selection of the second UI element 804 (in FIG. 8A). The selection may be received via the user device 114.

On the exemplary electronic UI 800D, there is shown a second set of UI elements, such as the fourth UI element 808 and the fifth UI element 810. The fourth UI element 708 may be labeled as "List All Popular Topics Tags" and may be a button. Similarly, the fifth UI element 810 may be labeled as "Topic Tags for Popular Repositories" and may also be a button.

In an embodiment, a third user input may be received for selection of the fifth UI element 810 (as depicted by the dotted rectangle). Based on the selection of the fifth UI element 810, an exemplary electronic UI 800E may be rendered on the display screen of the user device 114. The details about the exemplary electronic UI 800E are provided, for example, in FIG. 8E.

Figure 8E:
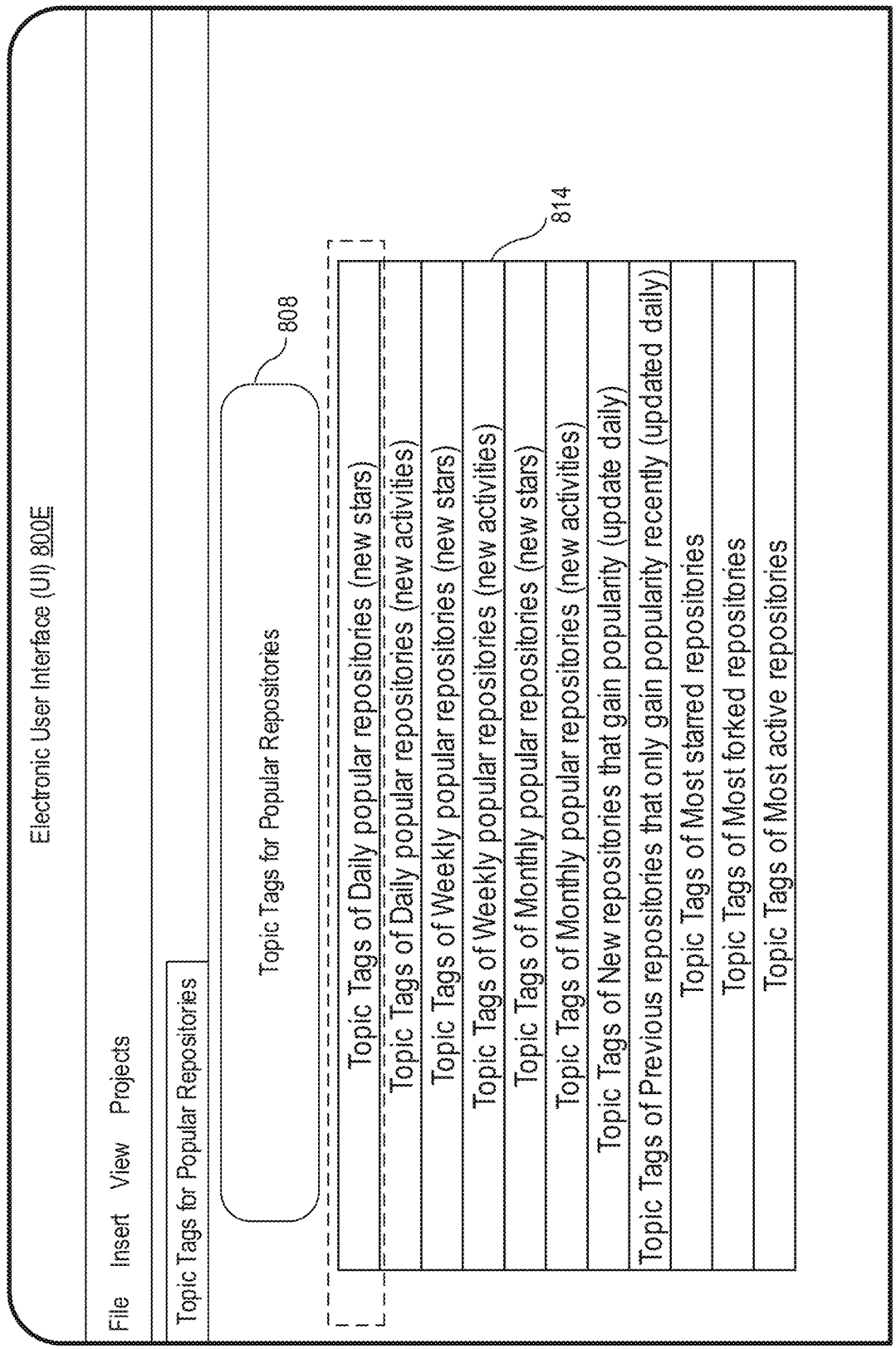
FIG. 8E is a diagram that illustrates an exemplary electronic user interface for displaying topic tags for popular repositories.

FIG. 8E is a diagram that illustrates an exemplary electronic user interface for displaying topic tags for popular repositories, according to at least one embodiment described in the present disclosure. FIG. 8E is explained in conjunction with elements from FIG. 1, FIG. 2, FIG. 3, FIG. 4, FIG. 5A, FIG. 5B, FIG. 6, FIG. 7A, FIG. 7B, FIG. 7C, FIG. 7D, FIG. 7E, FIG. 7F, FIG. 7G, FIG. 8A, FIG. 8B, FIG. 8C, and FIG. 8D. With reference to FIG. 8E, there is shown an exemplary electronic UI 800E, which may be an exemplary implementation of the electronic UI 118 of FIG. 1. The exemplary electronic UI 800E may be displayed on the user device 114 based on the selection of the fifth UI element 810 (shown in FIG. 8D). The selection may be received via the user device 114.

On the exemplary electronic UI 800E, there is shown a seventh UI element 814 that may be a drop-down list and may include a list of options. The list of options may include, for example, topic tags of daily popular repositories (new stars), topic tags of daily popular repositories (new activities), topic tags of weekly popular repositories (new stars), topic tags of weekly popular repositories (new activities), topic tags of monthly popular repositories (new stars), topic tags of monthly popular repositories (new activities), topic tags of new repositories that gain popularity (update daily), topic tags of previous repositories that only gain popularity recently (updated daily), topic tags of most starred repositories, topic tags of most forked repositories, topic tags of most active repositories, and the like.

In an embodiment, a fourth user input may be received for selection of a first option from the list of options included in the seventh UI element 814. Based on the selection of the first option (as depicted by the dotted rectangle), an exemplary electronic UI 800F may be rendered on the display screen of the user device 114. The details about the exemplary electronic UI 800F are provided, for example, in FIG. 8F.

FIG. 8F is a diagram that illustrates an exemplary electronic user interface for displaying topic tags of daily popular repositories, according to at least one embodiment described in the present disclosure. FIG. 8F is explained in conjunction with elements from FIG. 1, FIG. 2, FIG. 3, FIG. 4, FIG. 5A, FIG. 5B, FIG. 6, FIG. 7A, FIG. 7B, FIG. 7C, FIG. 7D, FIG. 7E, FIG. 7F, FIG. 7G, FIG. 8A, FIG. 8B, FIG. 8C, FIG. 8D, and FIG. 8E. With reference to FIG. 8F, there is shown an exemplary electronic UI 800F, which may be an exemplary implementation of the electronic UI 118 of FIG. 1.

On the exemplary electronic UI 800F, there is shown an eight UI element 816 which displays a fourth portion of the generated set of presentation data. In an embodiment, the fourth portion may correspond to a table associated with topic tags of daily popular repositories (new stars). The table may include at least five columns (say a first column, a second column, a third column, a fourth column, and a fifth column). The first column of the table may indicate a name of the topic tag. The second column may indicate a logo of the corresponding topic tag and a third column may indicate a short description about the corresponding topic tag. The fourth column may indicate a number of repositories associated with the corresponding column. Similarly, the fifth column may indicate a hyperlink to a metadata associated with the corresponding topic tag.

By way of example, and not limitation, the first column may include the names of popular topic tags as "Arduino" and "Android". The second column may include the logos for "Arduino" and "Android". The third column may include a short description associated with popular topic tags. For example, for "Arduino", the short description may include "Arduino is an open source hardware and software company and maker community. Arduino started in the early 2000s. Popular with electronic makers, Arduino offers a lot of flexibility through an open source system." The fourth column may include a number of repositories associated with the popular topic tags. As shown, for example, there may be 19,289 repositories associated with the Arduino topic tag. The fifth column may include a hyperlink to metadata associated with the popular topic tags.

Figure 9A:
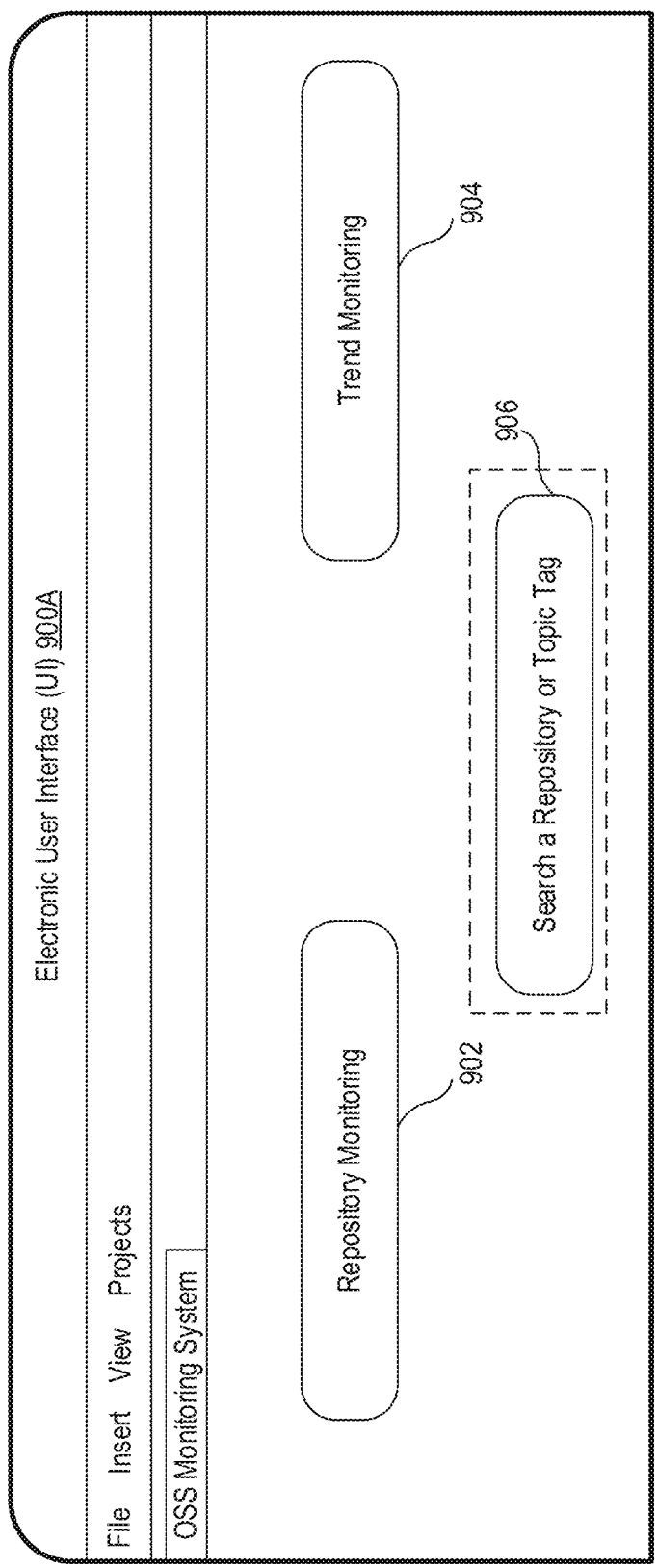
FIG. 9A is a diagram that illustrates an exemplary electronic user interface for displaying presentation data.

FIG. 9A is a diagram that illustrates an exemplary electronic user interface for displaying presentation data, according to at least one embodiment described in the present disclosure. FIG. 9A is explained in conjunction with elements from FIG. 1, FIG. 2, FIG. 3, FIG. 4, FIG. 5A, FIG. 5B, FIG. 6, FIG. 7A, FIG. 7B, FIG. 7C, FIG. 7D, FIG. 7E, FIG. 7F, FIG. 7G, FIG. 8A, FIG. 8B, FIG. 8C, FIG. 8D, FIG. 8E and FIG. 8F. With reference to FIG. 9A, there is shown an exemplary electronic UI 900A, which may be an exemplary implementation of the electronic UI 118 of FIG. 1.

The exemplary electronic UI 900A may be displayed on the user device 114 based on a user request, which may be received via an application interface displayed onto a display screen of the user device 114. The application interface may be part of an application software, for example, a software development kit (SDK), a cloud server-based application, a web-based application, an OS-based application/application suite, an enterprise application, a mobile application.

On the exemplary electronic UI 900A, there is shown a first set of UI elements, such as a first UI element 902, a second UI element 904, and a third UI element 906. The first UI element 902 may be labeled as "Repository Monitoring" and may be a button. The second UI element 904 may be labeled as "Trend Monitoring" and may also be a button. Similarly, the third UI element 906 may be labeled as "Search a Repository or Topic Tag" and may also be a button.

The first UI element 902 may be used for displaying a repository-based trend monitoring interface on the electronic UI, the second UI element 904 may be used for displaying a topic-based trend monitoring interface on the electronic UI, and the third UI element 906 may be used for displaying a search interface on the exemplary electronic UI 900A.

In an embodiment, a first user input may be received for selection of the third UI element 906 (as depicted by the dotted rectangle). Based on the selection of the third UI element 906, an exemplary electronic UI 900B may be rendered on the display screen of the user device 114. The details about the exemplary electronic UI 900B are provided, for example, in FIG. 9B.

Figure 9B:
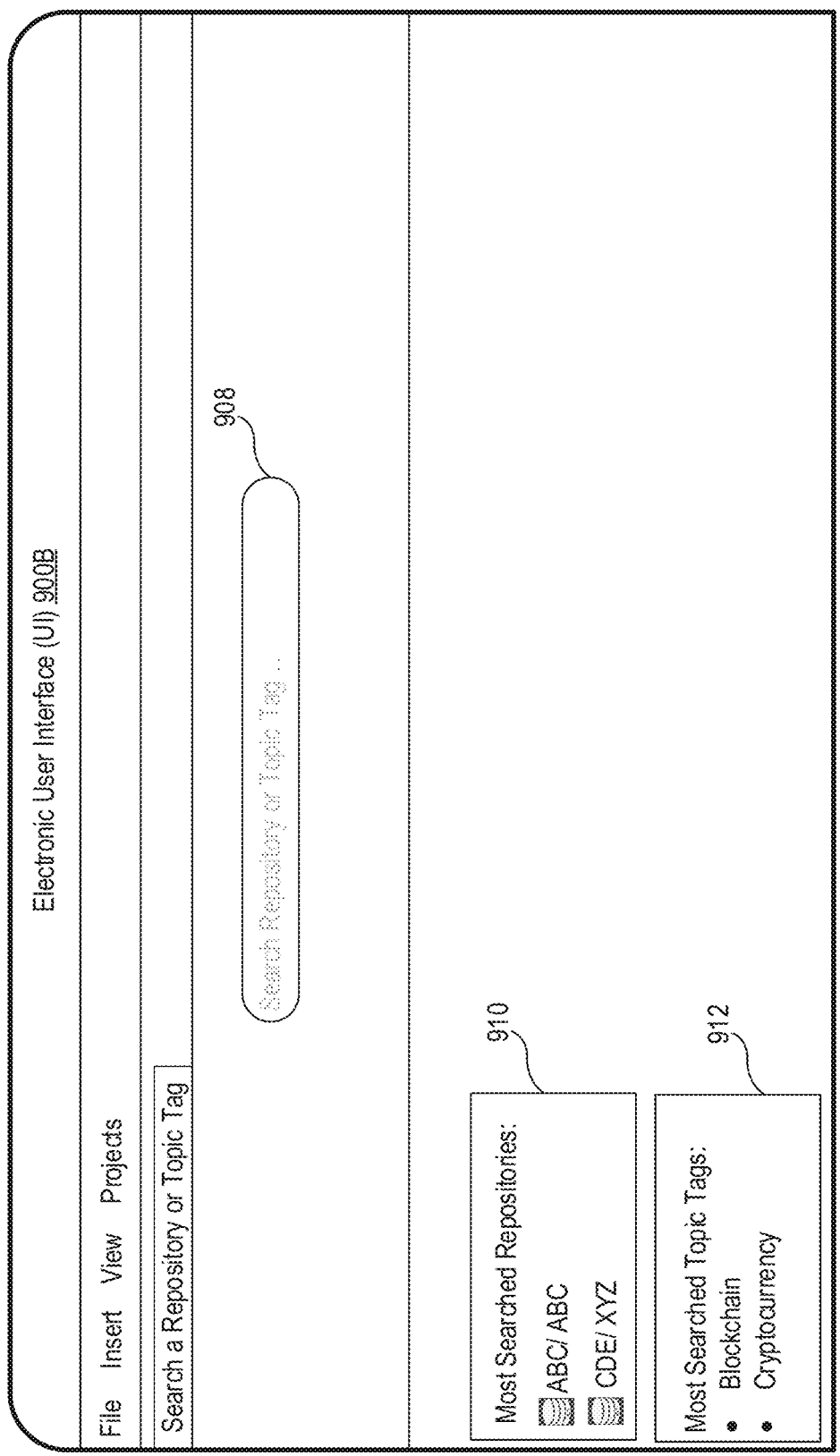
FIG. 9B is a diagram that illustrates an exemplary electronic user interface for searching a repository or a topic tag.

FIG. 9B is a diagram that illustrates an exemplary electronic user interface for searching a repository or a topic tag, according to at least one embodiment described in the present disclosure. FIG. 9B is explained in conjunction with elements from FIG. 1, FIG. 2, FIG. 3, FIG. 4, FIG. 5A, FIG. 5B, FIG. 6, FIG. 7A, FIG. 7B, FIG. 7C, FIG. 7D, FIG. 7E, FIG. 7F, FIG. 7G, FIG. 8A, FIG. 8B, FIG. 8C, FIG. 8D, FIG. 8E, FIG. 8F, and FIG. 9A. With reference to FIG. 9B, there is shown an exemplary electronic UI 900B, which may be an exemplary implementation of the electronic UI 118 of FIG. 1.

The exemplary electronic UI 900B may be displayed on the user device 114 based on the selection of the third UI element 906 (shown in FIG. 9A). The selection may be received via the user device 114.

On the exemplary electronic UI 900B, there is shown a fourth UI element 908, a fifth UI element 910, and a sixth UI element. The fourth UI element 908 may be a search bar or a search interface. To search a repository or a topic tag, the user may write a name of the repository or the topic tag in the search bar. A list of search results may be displayed in response to the searched repository or the searched topic tag. In case a repository is searched, an electronic UI (similar to the exemplary electronic UI 700E) may be displayed with values in the table corresponding to the searched repository. In case the topic tag is searched, an electronic UI similar to the exemplary electronic UI 700F may be displayed with values in the table corresponding to the searched topic tag. The values in the table may be retrieved from the generated set of presentation data.

The fifth UI element 910 may be used to display a list of most search repositories. Based on a selection of at least one repository from the list of most search repositories, an electronic UI similar to the exemplary electronic UI 700E may be displayed with values in the table corresponding to the searched repository.

The sixth UI element 912 may be used to display a list of most search topic tags. Based on a selection of at least one topic tag from the list of most search topic tags, an electronic UI similar to the electronic UI 700F may be displayed with values in the table corresponding to the searched topic tag.

Figure 10:
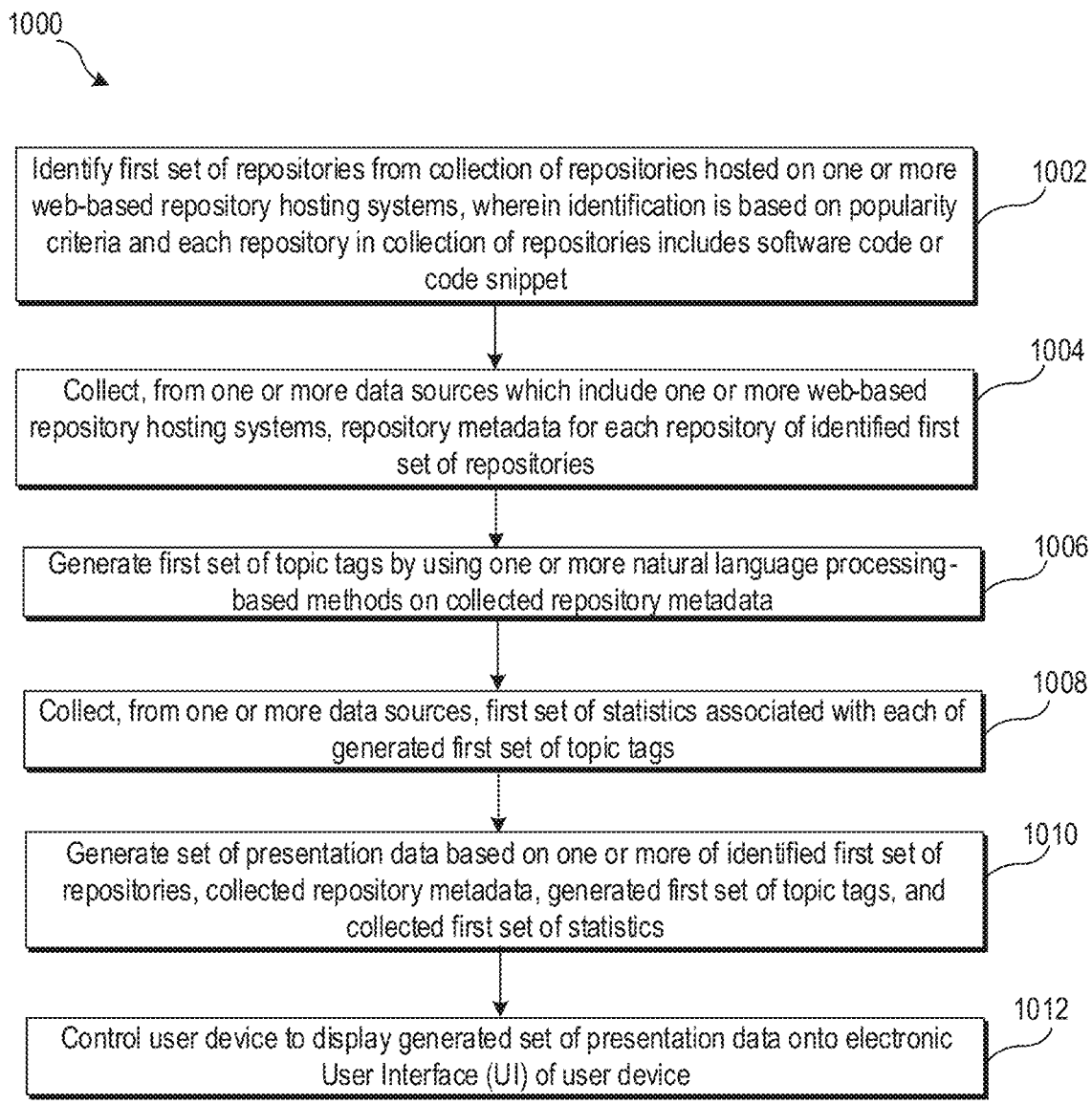
FIG. 10 illustrates a flowchart of an exemplary method for trend monitoring of code repositories and related information.

FIG. 10 illustrates a flowchart of an exemplary method for trend monitoring of code repositories and related information, according to at least one embodiment described in the present disclosure. FIG. 10 is explained in conjunction with elements from FIG. 1, FIG. 2, FIG. 3, FIG. 4, FIG. 5A, FIG. 5B, FIG. 6, FIG. 7A, FIG. 7B, FIG. 7C, FIG. 7D, FIG. 7E, FIG. 7F, FIG. 7G, FIG. 8A, FIG. 8B, FIG. 8C, FIG. 8D, FIG. 8E, FIG. 8F, FIG. 9A, and FIG. 9B. With reference to FIG. 10, there is shown a flowchart 1000. The method illustrated in the flowchart 1000 may start at 1002 and may be performed by any suitable system, apparatus, or device, such as by the system 102 of FIG. 1 or FIG. 2.

At 1002, the first set of repositories 112 from the collection of repositories 110 may be identified. The collection of repositories 110 may be hosted on the one or more web-based repository hosting systems 106. The identification of the first set of repositories 112 may be based on popularity criteria and each repository in the collection of repositories 110 may include the software code or the code snippet. The details about the identification of the first set of repositories 112 are provided in FIG. 1 and FIG. 3.

At 1004, the repository metadata for each repository of the identified first set of repositories 112 may be collected from the one or more data sources 104. The one or more data sources 104 may include the one or more web-based repository hosting systems 106. The repository metadata for each repository of the identified first set of repositories 112 may be collected by using the second set of API calls to one or more data sources 104. Moreover, the repository metadata may be collected periodically at each interval in a schedule. The details about the collection of the repository metadata are provided in FIG. 1 and FIG. 3.

At 1006, the first set of topic tags may be generated by using one or more natural language processing-based methods on the collected repository metadata. The first set of topic tags may be generated by the first type of repository description (short description) and the second type of repository description (long description). The details about the generation of the first set of topic tags are provided in FIG. 5A and FIG. 5B.

At 1008, the first set of statistics associated with each of the generated first set of topic tags may be collected. The first set of statistics may be collected from the one or more data sources 104. The details about the first set of statistics and the collection of the first set of statistics are provided in FIG. 3.

At 1010, the set of presentation data may be generated. The set of presentation data may be generated based on one or more of the identified first set of repositories 112, the collected repository metadata, the generated first set of topic tags, and the collected first set of statistics.

At 1012, the user device 114 may be controlled to display the generated set of presentation data onto the electronic UI 118 of the user device 114. The details about the displaying the generated set of presentation data are provided in FIG. 7A, FIG. 7B, FIG. 7C, FIG. 7D, FIG. 7E, FIG. 7F, FIG. 7G, FIG. 8A, FIG. 8B, FIG. 8C, FIG. 8D, FIG. 8E, FIG. 8F, FIG. 9A, and FIG. 9B.

Control may pass to end. Although the flowchart 1000 is illustrated as discrete operations, such as 1002, 1004, 1006, 1008, 1010, and 1012. However, in certain embodiments, such discrete operations may be further divided into additional operations, combined into fewer operations, or eliminated, depending on the particular implementation without detracting from the essence of the disclosed embodiments.

Various embodiments of the disclosure may provide one or more non-transitory computer-readable storage medium configured to store instructions that, in response to being executed, cause a system (such as the system 102) to perform operations. The operations may include identifying a first set of repositories (such as the first set of repositories 112) from a collection of repositories (such as the collection of repositories 110) hosted on one or more web-based repository hosting systems (such as the one or more web-based repository hosting systems 106). The identification may be based on popularity criteria and each repository in the collection of repositories may include a software code or a code snippet. The operations may further include collecting repository metadata for each repository of the identified first set of repositories from one or more data sources (such as the one or more data sources 104) which includes the one or more web-based repository hosting systems. The operations may further include generating a first set of topic tags by using one or more natural language processing-based methods on the collected repository metadata. The operations may further include collecting first set of statistics associated with each of the generated first set of topic tags. The operations may further include generating a set of presentation data based on one or more of the identified first set of repositories, the collected repository metadata, the generated first set of topic tags, and the collected first set of statistics. The operations may further include controlling a user device (such as the user device 114) to display the generated set of presentation data onto an electronic User Interface (UI) (such as the electronic UI 118) of the user device.

As indicated above, the embodiments described in the present disclosure may include the use of a special purpose or general-purpose computer (e.g., the processor 202 of FIG. 2) including various computer hardware or software modules, as discussed in greater detail below. Further, as indicated above, embodiments described in the present disclosure may be implemented using computer-readable media (e.g., the memory 204 or the persistent data storage 206 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, comprising:
    identifying a first set of repositories from a collection of repositories hosted on one or more web-based repository hosting systems,
        wherein the identification is based on popularity criteria and each repository in the collection of repositories comprises a software code or a code snippet;
    collecting, from one or more data sources which include the one or more web-based repository hosting systems, a repository metadata for each repository of the identified first set of repositories;
    generating a first set of topic tags by using one or more natural language processing-based methods on the collected repository metadata;
    collecting, from the one or more data sources, first set of statistics associated with each of the generated first set of topic tags;
    generating a set of presentation data based on one or more of the identified first set of repositories, the collected repository metadata, the generated first set of topic tags, and the collected first set of statistics; and
    controlling a user device to display the generated set of presentation data onto an electronic User Interface (UI) of the user device;
    wherein the repository metadata for each repository of the identified first set of repositories is collected by using a second set of application programming interface (API) calls to one or more data sources, and the repository metadata is collected periodically at each interval in a schedule, the second set of API calls being different from a first set of API calls.

2. The method according to claim 1, further comprising:
    generating a plurality of query strings based on one or more search parameters comprising at least one of: a period filter, an interval filter, or one or more popularity tags specified in the popularity criteria,
        wherein each query string of the generated plurality of query strings is appended to a corresponding uniform resource locator (URL) of a webpage hosted on the one or more data sources; and
    query the one or more data sources using the generated plurality of query strings to generate a first plurality of tables, each of which lists repositories associated with one or more popularity tags,
        wherein the repositories listed in each of the generated first plurality of tables are included in the identified first set of repositories.

3. The method according to claim 2, further comprising:
    merging the generated plurality of tables into a watchlist table,
        wherein each record of the watchlist table includes a repository name or identifier and names of one or more tables of the generated plurality of tables, in which the repository name or identifier occurs.

4. The method according to claim 1, further comprising:
    extracting a list of repositories using the first set API calls to the one or more data sources,
        wherein each API call of the first set of API calls comprises one or more search parameters comprising at least one of: a period filter, an interval filter, or one or more popularity tags specified in the popularity criteria;
    filtering the extracted list of repositories based on first criteria;
    populating a second plurality of tables using the filtered list of repositories,
        wherein the second plurality of tables is populated according to the one or more popularity tags; and
    merging the generated second plurality of tables into a watchlist table,
        wherein repositories listed in the watchlist table are included in the identified first set of repositories.

5. The method according to claim 1, further comprising:
    generating a plurality of repository data tables based on the collected repository metadata for each of the first set of repositories,
        wherein each of the generated plurality of repository data tables include the collected repository metadata for each interval of the schedule.

6. The method according to claim 1, further comprising:
    collecting, from the one or more data sources, a second set of human-labeled topic tags associated with the collection of repositories; and
    collecting, from the one or more data sources, topic metadata associated with each of the collected second set of human-labeled topic tags.

7. The method according to claim 6, further comprising:
    generating a knowledge graph database based on the collected topic metadata and the collected second set of human-labeled topic tags, and
        wherein the set of presentation data is further generated based on the generated knowledge graph database.

8. The method according to claim 1, further comprising:
    querying the one or more data sources using search strings to extract a second set of statistics associated with each topic tag in the second set of human-labeled topic tags; and
    generating a first topic table which lists the second set of human-labeled topics and the extracted second set of statistics,
        wherein the set of presentation data is further generated based on the generated first topic table.

9. The method according to claim 1, wherein the collected repository metadata comprises a first type of repository description and a second type of repository description.

10. The method according to claim 9, wherein the first set of topic tags is generated by:
   extracting first text included in the first type of repository description;
   performing a text normalization operation on the extracted first text to generate a first normalized text;
   extracting a set of noun phrases from the first normalized text, using the one or more natural language processing-based methods; and
   updating the extracted set of noun phrases by removing one or more duplicate instances of a noun phase,
      wherein the updated set of noun phrases is included as topic tags in the first set of topic tags.

11. The method according to claim 9, wherein the first set of topic tags is generated by:
   extracting second text included in the second type of repository description;
   performing a text normalization operation on the extracted second text to generate a second normalized text;
   extracting a group of keywords from the second normalized text by applying a machine learning-based topic modelling method on the second normalized text,
      wherein the machine learning-based topic modelling method is one of the one or more natural language processing-based methods;
   generating one or more queries using the extracted group of keywords;
   querying a structured database using the generated one or more queries to extract a set of theme tags;
   ranking the extracted set of theme tags based on a tag relevancy score associated with each of the extracted set of theme tags; and
   extracting a subset of the ranked set of theme tags,
      wherein the extracted subset is included as topic tags in the first set of topic tags.

12. The method according to claim 1, wherein the electronic UI comprises a first UI element to view a repository-based trend monitoring interface on the electronic UI, a second UI element to view a topic-based trend monitoring interface on the electronic UI, and a third UI element to view a search interface on the electronic UI.

13. The method according to claim 1, further comprising:
   receiving, via the electronic UI, a first input comprising a selection of one of the first UI element, the second UI element, or the third UI element,
      wherein a first portion of the generated set of presentation data is displayed onto a fourth UI element of the electronic UI, based on the received first input.

14. The method according to claim 13, further comprising:
   receiving, via the electronic UI, a second input comprising a selection of a linked item included in the displayed first portion of the set of presentation data,
      wherein a second portion of the generated set of presentation data is displayed onto a fifth UI element of the electronic UI, based on the received second input, and wherein the second portion is associated with the linked item.

15. A non-transitory computer-readable storage medium configured to store instructions that, in response to being executed, causes a system to perform operations, the operations comprising:
   identifying a first set of repositories from a collection of repositories hosted on one or more web-based repository hosting systems,
      wherein the identification is based on popularity criteria and each repository in the collection of repositories comprises a software code or a code snippet;
   collecting, from one or more data sources which include the one or more web-based repository hosting systems, a repository metadata for each repository of the identified first set of repositories;
   generating a first set of topic tags by using one or more natural language processing-based methods on the collected repository metadata;
   collecting, from the one or more data sources, first set of statistics associated with each of the generated first set of topic tags;
   generating a set of presentation data based on one or more of the identified first set of repositories, the collected repository metadata, the generated first set of topic tags, and the collected first set of statistics; and
   controlling a user device to display the generated set of presentation data onto an electronic User Interface (UI) of the user device;
   wherein the repository metadata for each repository of the identified first set of repositories is collected by using a second set of application programming interface (API) calls to one or more data sources, and the repository metadata is collected periodically at each interval in a schedule, the second set of API calls being different from a first set of API calls.

16. The non-transitory computer-readable storage medium according to claim 15, wherein the operations further comprise:
   generating a plurality of query strings based on one or more search parameters comprising at least one of: a period filter, an interval filter, or one or more popularity tags specified in the popularity criteria,
      wherein each query string of the generated plurality of query strings is appended to a corresponding uniform resource locator (URL) of a webpage hosted on the one or more data sources; and
   query the one or more data sources using the generated plurality of query strings to generate a first plurality of tables, each of which lists repositories associated with one or more popularity tags,
   wherein the repositories listed in each of the generated first plurality of tables are included in the identified first set of repositories.

17. The non-transitory computer-readable storage medium according to claim 15, wherein the operations further comprise:
   extracting a list of repositories using the first set API calls to the one or more data sources,
      wherein each API call of the second set of API of calls comprises one or more search parameters comprising at least one of: a period filter, an interval filter, or one or more popularity tags specified in the popularity criteria;
   filtering the extracted list of repositories based on first criteria;
   populating a second plurality of tables using the filtered list of repositories,
      wherein the second plurality of tables is populated according to the one or more popularity tags; and
   merging the generated second plurality of tables into a watchlist table, wherein repositories listed in the watchlist table are included in the identified first set of repositories.

18. The non-transitory computer-readable storage medium according to claim 15, wherein:
the repository metadata is collected periodically at each interval in a schedule.

19. A system, comprising:
a processor configured to:
identify a first set of repositories from a collection of repositories hosted on one or more web-based repository hosting systems,
wherein the identification is based on popularity criteria and each repository in the collection of repositories comprises a software code or a code snippet;
collect, from one or more data sources which include the one or more web-based repository hosting systems, a repository metadata for each repository of the identified first set of repositories;
generate a first set of topic tags by using one or more natural language processing-based methods on the collected repository metadata;
collect, from the one or more data sources, first set of statistics associated with each of the generated first set of topic tags;
generate a set of presentation data based on one or more of the identified first set of repositories, the collected repository metadata, the generated first set of topic tags, and the collected first set of statistics; and
control a user device to display the generated set of presentation data onto an electronic User Interface (UI) of the user device;
wherein the repository metadata for each repository of the identified first set of repositories is collected by using a second set of application programming interface (API) calls to one or more data sources, and the repository metadata is collected periodically at each interval in a schedule, the second set of API calls being different from a first set of API calls.

* * * * *